US012591237B2

(12) United States Patent　　Maruiwa

(10) Patent No.: US 12,591,237 B2
(45) Date of Patent: Mar. 31, 2026

(54) MOVING BODY CONTROL METHOD, MOVING BODY CONTROL SYSTEM, AND NON-TRANSITORY COMPUTER-READABLE RECORDING MEDIUM

(71) Applicant: TOYOTA JIDOSHA KABUSHIKI KAISHA, Toyota (JP)

(72) Inventor: Nobutsugu Maruiwa, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 18/127,049

(22) Filed: Mar. 28, 2023

(65) Prior Publication Data

US 2023/0315091 A1　　Oct. 5, 2023

(30) Foreign Application Priority Data

Mar. 30, 2022　(JP) ................................. 2022-056497

(51) Int. Cl.
G05D 1/00 (2024.01)
B60W 30/06 (2006.01)

(52) U.S. Cl.
CPC ........... G05D 1/0077 (2013.01); B60W 30/06 (2013.01); G05D 1/0011 (2013.01); (Continued)

(58) Field of Classification Search
CPC .. G05D 1/0077; G05D 1/0011; G05D 1/0234; G05D 1/0274; G05D 1/0055; B60W 30/06; B60W 2556/40; H04W 4/021; H04W 4/029; H04W 4/40; H04W 12/06; B62D 15/0285; G08G 1/096877; G08G 1/14

See application file for complete search history.

(56) References Cited

U.S. PATENT DOCUMENTS

| 10,789,847 B2 | 9/2020 | Maruiwa et al. |
| 10,845,807 B2 | 11/2020 | Mukaiyama |

(Continued)

FOREIGN PATENT DOCUMENTS

| CN | 107393293 A | 11/2017 |
| CN | 110780294 A | 2/2020 |

(Continued)

*Primary Examiner* — Madison R. Inserra
(74) *Attorney, Agent, or Firm* — Dinsmore & Shohl LLP

(57) ABSTRACT

A moving body control method controls a moving body having a function of operating in accordance with a remote instruction in a predetermined area. The moving body control method includes: a remote instruction verification process that determines whether or not the remote instruction received by the moving body is valid; and an operation limiting process that limits at least a part of an operation of the moving body without following the remote instruction, when the remote instruction received by the moving body is invalid. The remote instruction verification process includes: determining whether or not the moving body is present in the predetermined area at a time when the moving body receives the remote instruction; and determining that the remote instruction is invalid, when the moving body is not present in the predetermined area at the time when the moving body receives the remote instruction.

13 Claims, 20 Drawing Sheets

(52) U.S. Cl.
CPC ......... *G05D 1/0234* (2013.01); *G05D 1/0274*
(2013.01); *B60W 2556/40* (2020.02)

(56) References Cited

U.S. PATENT DOCUMENTS

| | | | |
|---|---|---|---|
| 11,173,895 B2 | 11/2021 | Sugano | |
| 11,267,460 B2 | 3/2022 | Sugano | |
| 2013/0151038 A1 | 6/2013 | Harumoto et al. | |
| 2017/0243408 A1* | 8/2017 | Lei ........................ H04L 63/126 |
| 2019/0344750 A1 | 11/2019 | Takata | |
| 2020/0012274 A1 | 1/2020 | Kamiya et al. | |
| 2020/0031312 A1* | 1/2020 | Schat ................... G01S 13/886 |
| 2020/0074859 A1 | 3/2020 | Eshima | |
| 2020/0207334 A1 | 7/2020 | Cho | |
| 2020/0223430 A1 | 7/2020 | Matsunaga | |
| 2020/0254998 A1 | 8/2020 | Tzempetzis et al. | |
| 2020/0290640 A1 | 9/2020 | Schuller | |
| 2020/0317189 A1 | 10/2020 | Matsunaga | |
| 2020/0346553 A1* | 11/2020 | Grimm ................... B60L 53/65 |
| 2020/0388155 A1 | 12/2020 | Mukaiyama | |
| 2021/0009111 A1 | 1/2021 | Kang | |
| 2021/0078601 A1 | 3/2021 | Sugano | |
| 2021/0086757 A1 | 3/2021 | Sugano | |
| 2021/0221359 A1 | 7/2021 | Yamamoto et al. | |
| 2021/0233404 A1 | 7/2021 | Matsuhana et al. | |
| 2021/0387619 A1 | 12/2021 | Yatagai et al. | |
| 2022/0343764 A1* | 10/2022 | Mizoguchi ....... G08G 1/096725 |
| 2022/0392345 A1 | 12/2022 | Wada et al. | |

FOREIGN PATENT DOCUMENTS

| | | |
|---|---|---|
| EP | 0687964 B1 | 12/1995 |
| JP | 2002-197575 A | 7/2002 |
| JP | 2009-526707 A | 7/2009 |
| JP | 2013-123097 A | 6/2013 |
| JP | 2019-194801 A | 11/2019 |
| JP | 2019-196148 A | 11/2019 |
| JP | 2020-190412 A | 11/2020 |
| JP | 2021-117726 A | 8/2021 |
| JP | 2021-196690 A | 12/2021 |
| KR | 2021-0007903 A | 1/2021 |
| WO | 2007/094988 A2 | 8/2007 |
| WO | 2021/145235 A1 | 7/2021 |
| WO | 2021/166620 A1 | 8/2021 |

* cited by examiner

2: MANAGEMENT SYSTEM

MOVING BODY CONTROL METHOD, MOVING BODY CONTROL SYSTEM, AND NON-TRANSITORY COMPUTER-READABLE RECORDING MEDIUM

CROSS-REFERENCE TO RELATED APPLICATION

This application claims priority to Japanese Patent Application No. 2022-056497 filed on Mar. 30, 2022, the entire contents of which are incorporated by reference herein.

BACKGROUND

Technical Field

The present disclosure relates to a technique for controlling a moving body having a function of operating in accordance with a remote instruction in a predetermined area.

Background Art

Patent Literature 1 discloses a control device used in a parking lot for automated valet parking. A vehicle reads a marker placed in the parking lot and estimates an absolute position of the vehicle based on a relative distance between the vehicle and the marker. On the other hand, the control device acquires information on the vehicle position measured by a sensor installed in the parking lot. The control device compares a static estimation accuracy, which is a difference between the estimated vehicle position and the measured vehicle position, with a reference value. When the static estimation accuracy is equal to or less than the reference value, the control device prevents the vehicle from using an automated valet parking function.

LIST OF RELATED ART

Patent Literature 1: International Publication No. WO2021/166620

SUMMARY

A moving body (e.g., a vehicle, or a robot) having a function of operating in accordance with a remote instruction in a predetermined area will be considered. For example, when a vehicle supporting automated valet parking enters a parking lot (a predetermined area) or exits the parking lot, the vehicle receives a remote instruction instructing power-on from a management system. The vehicle is automatically powered on in accordance with the received remote instruction and then starts automated travel in the parking lot.

Controlling the operation of the moving body through the remote instruction is useful in providing services using the moving body, and the like. However, since the moving body has the function of operating in accordance with the remote instruction, there is a possibility that the function is abused. That is, there is a possibility that someone with malicious intent fakes a remote instruction and issues the fake remote instruction to operate (hijack) the moving body without permission. For example, it is conceivable that someone with malicious intent powers on the moving body, unlocks its door, and steals the moving body. As another example, it is also conceivable that someone with malicious intent powers on the moving body and makes the moving body automatically travel to cause an accident.

An object of the present disclosure is to provide a technique capable of suppressing abuse of a function of a moving body that operates in accordance with a remote instruction in a predetermined area.

A first aspect is directed to a moving body control method for controlling a moving body having a function of operating in accordance with a remote instruction in a predetermined area.

The moving body control method includes:

a remote instruction verification process that determines whether or not the remote instruction received by the moving body is valid; and an operation limiting process that limits at least a part of an operation of the moving body without following the remote instruction, when the remote instruction received by the moving body is invalid.

The remote instruction verification process includes:

determining whether or not the moving body is present in the predetermined area at a time when the moving body receives the remote instruction; and determining that the remote instruction is invalid, when the moving body is not present in the predetermined area at the time when the moving body receives the remote instruction.

A second aspect is directed to a moving body control system for controlling a moving body having a function of operating in accordance with a remote instruction in a predetermined area.

The moving body control system includes one or more processors.

The one or more processors are configured to execute:

a remote instruction verification process that determines whether or not the remote instruction received by the moving body is valid; and an operation limiting process that limits at least a part of an operation of the moving body without following the remote instruction, when the remote instruction received by the moving body is invalid.

The remote instruction verification process includes:

determining whether or not the moving body is present in the predetermined area at a time when the moving body receives the remote instruction; and determining that the remote instruction is invalid, when the moving body is not present in the predetermined area at the time when the moving body receives the remote instruction.

A third aspect is directed to a moving body control program for controlling a moving body having a function of operating in accordance with a remote instruction in a predetermined area.

The moving body control program, when executed by a computer, causes the computer to execute:

a remote instruction verification process that determines whether or not the remote instruction received by the moving body is valid; and an operation limiting process that limits at least a part of an operation of the moving body without following the remote instruction, when the remote instruction received by the moving body is invalid.

The remote instruction verification process includes:

determining whether or not the moving body is present in the predetermined area at a time when the moving body receives the remote instruction; and determining that the remote instruction is invalid, when the moving body is not present in the predetermined area at the time when the moving body receives the remote instruction.

According to the present disclosure, when the moving body receives the remote instruction, the remote instruction verification process is performed to determine whether or not the remote instruction is valid. When the remote instruction received by the moving body is invalid, the operation limiting process that limits at least a part of the operation of the moving body without following the remote instruction is performed. As a result, the abuse of the function of the moving body that operates in accordance with the remote instruction is suppressed.

EMBODIMENTS

Embodiments of the present disclosure will be described with reference to the accompanying drawings.

1. Moving Body Operating in Accordance with Remote Instruction

1-1. Overview

A moving body having a function of operating in accordance with a remote instruction is considered. Examples of the moving body include a vehicle, a robot, and the like. As an example, a case where the moving body is a vehicle will be considered in the following description. When generalizing, "vehicle" in the following description is replaced with "moving body."

Figure 1:
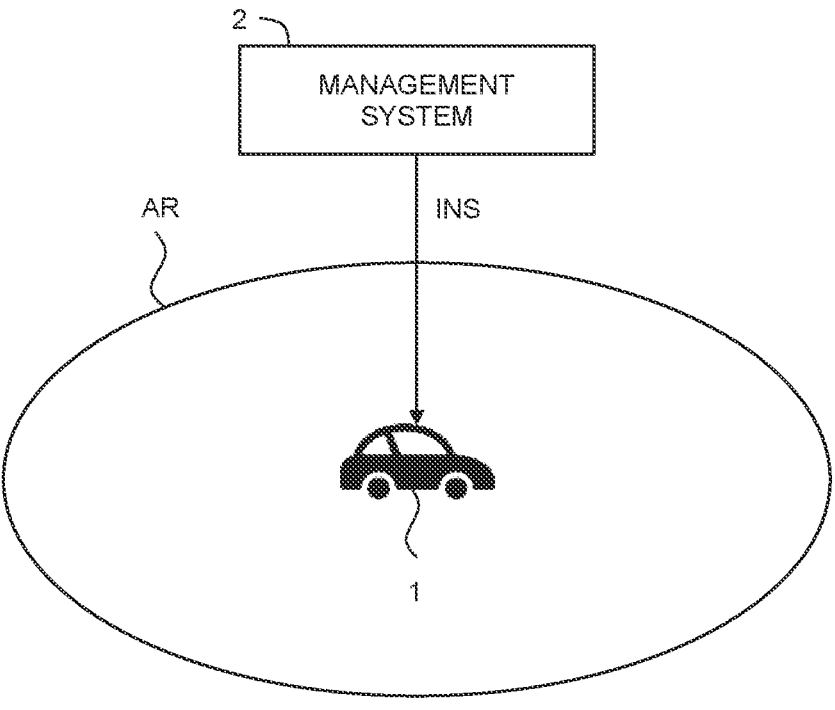
FIG. 1 is a conceptual diagram for explaining an overview of a vehicle according to an embodiment.

FIG. 1 is a conceptual diagram for explaining an overview of a vehicle 1 according to the present embodiment. The vehicle 1 has a function of operating in accordance with a remote instruction INS. In particular, the vehicle 1 has a function of operating in accordance with the remote instruction INS in a predetermined area AR.

The predetermined area AR is, for example, an area in which the vehicle 1 is able to travel automatically. In this case, the vehicle 1 automatically travels in the predetermined area AR in accordance with the remote instruction INS. As another example, the predetermined area AR may be an area in which a service utilizing the vehicle 1 is provided. In this case, the vehicle 1 provides the service in the predetermined area AR in accordance with the remote instruction INS. Various examples of the predetermined area AR will be described later.

The remote instruction INS instructs to power on or off the vehicle 1, for example. "Powering on the vehicle 1" means bringing the vehicle 1 into an operable state. For example, the powering on the vehicle 1 includes starting power supply to various devices installed on the vehicle 1. The powering on the vehicle 1 may include turning on ignition of the vehicle 1. On the other hand, "powering off the vehicle 1" means bringing the vehicle 1 into an inoperable state. For example, the powering off the vehicle 1 includes turning off the ignition of the vehicle 1. As another example, the powering off the vehicle 1 may include stopping power supply to various devices installed on the vehicle 1. It should be noted that at least a function of receiving the remote instruction INS is activated even after the vehicle 1 is powered off. Therefore, even after the power-off, the vehicle 1 can receive a remote instruction INS instructing the power-on and automatically power on in accordance with the remote instruction INS.

As another example, the remote instruction INS may instruct to perform at least one of steering, acceleration, and deceleration of the vehicle 1. As still another example, the remote instruction INS may instruct to perform autonomous travel of the vehicle 1. As still another example, the remote instruction INS may instruct to recognize a situation around the vehicle 1 using a recognition sensor installed on the vehicle 1.

As still another example, the remote instruction INS may instruct to lock or unlock a door of the vehicle 1.

The remote instruction INS is generated by a management system 2. The management system 2 manages at least the vehicle 1 in the predetermined area AR. The management system 2 may manage the predetermined area AR. The management system 2 may manage the service provided by utilizing the vehicle 1 in the predetermined area AR. The vehicle 1 and the management system 2 can communicate with each other. The management system 2 transmits the remote instruction INS to the vehicle 1 in the predetermined area AR, as necessary. The vehicle 1 in the predetermined area AR receives the remote instruction INS transmitted from the management system 2 and operates in accordance with the received remote instruction INS.

The management system 2 is realized by, for example, a management server on a cloud. The management system 2 may be configured by multiple servers that perform distributed processing.

Figure 2:
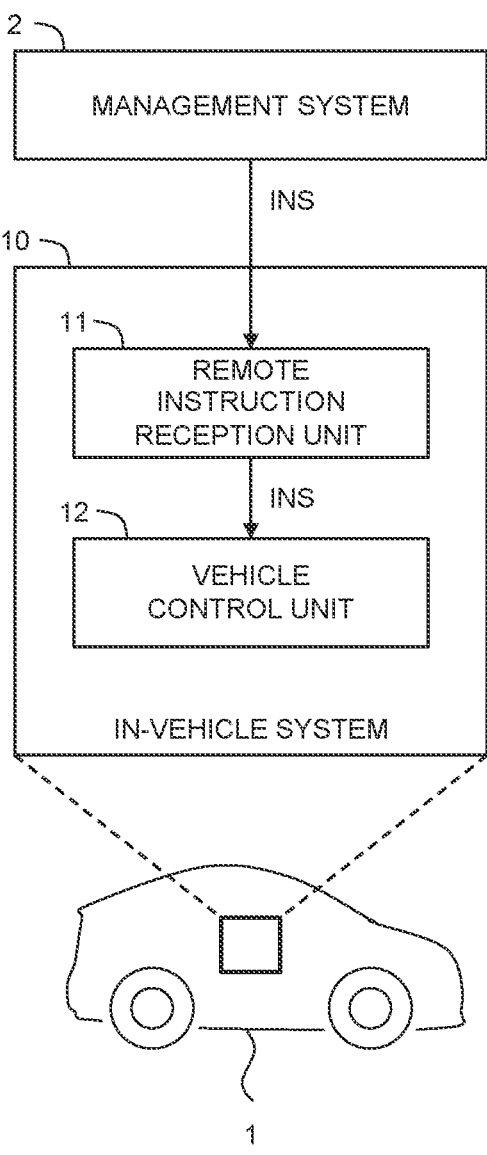
FIG. 2 is a block diagram for explaining an overview of an in-vehicle system according to an embodiment.

FIG. 2 is a block diagram for explaining an overview of an in-vehicle system 10 installed on the vehicle 1. The in-vehicle system 10 includes a remote instruction reception unit 11 and a vehicle control unit 12.

The remote instruction reception unit 11 receives the remote instruction INS transmitted from the management system 2. It should be noted that even after the vehicle 1 is powered off, the remote instruction reception unit 11 is activated and stands by for the remote instruction INS transmitted from the management system 2.

The vehicle control unit 12 controls the vehicle 1. For example, the controlling the vehicle 1 includes powering on or off the vehicle 1. As another example, the controlling the vehicle 1 includes controlling travel (steering, acceleration, and deceleration) of the vehicle 1. As still another example, the controlling the vehicle 1 may include automated driving control of the vehicle 1. As still another example, the controlling the vehicle 1 may include recognizing a situation around the vehicle 1 by using a recognition sensor installed on the vehicle 1. As still another example, the controlling the vehicle 1 may include locking or unlocking a door of the vehicle 1. As still another example, the controlling the vehicle 1 may include turning on or off a light (e.g., a headlight, a hazard lamp) of the vehicle 1. As still another example, the controlling the vehicle 1 may include blowing a horn of the vehicle 1.

When the remote instruction reception unit 11 receives the remote instruction INS, the vehicle control unit 12 controls the vehicle 1 in accordance with the received remote instruction.

Hereinafter, examples of the vehicle 1 that operates in accordance with the remote instruction INS in the predetermined area AR will be described.

1-2. Automated Valet Parking

Figure 3:
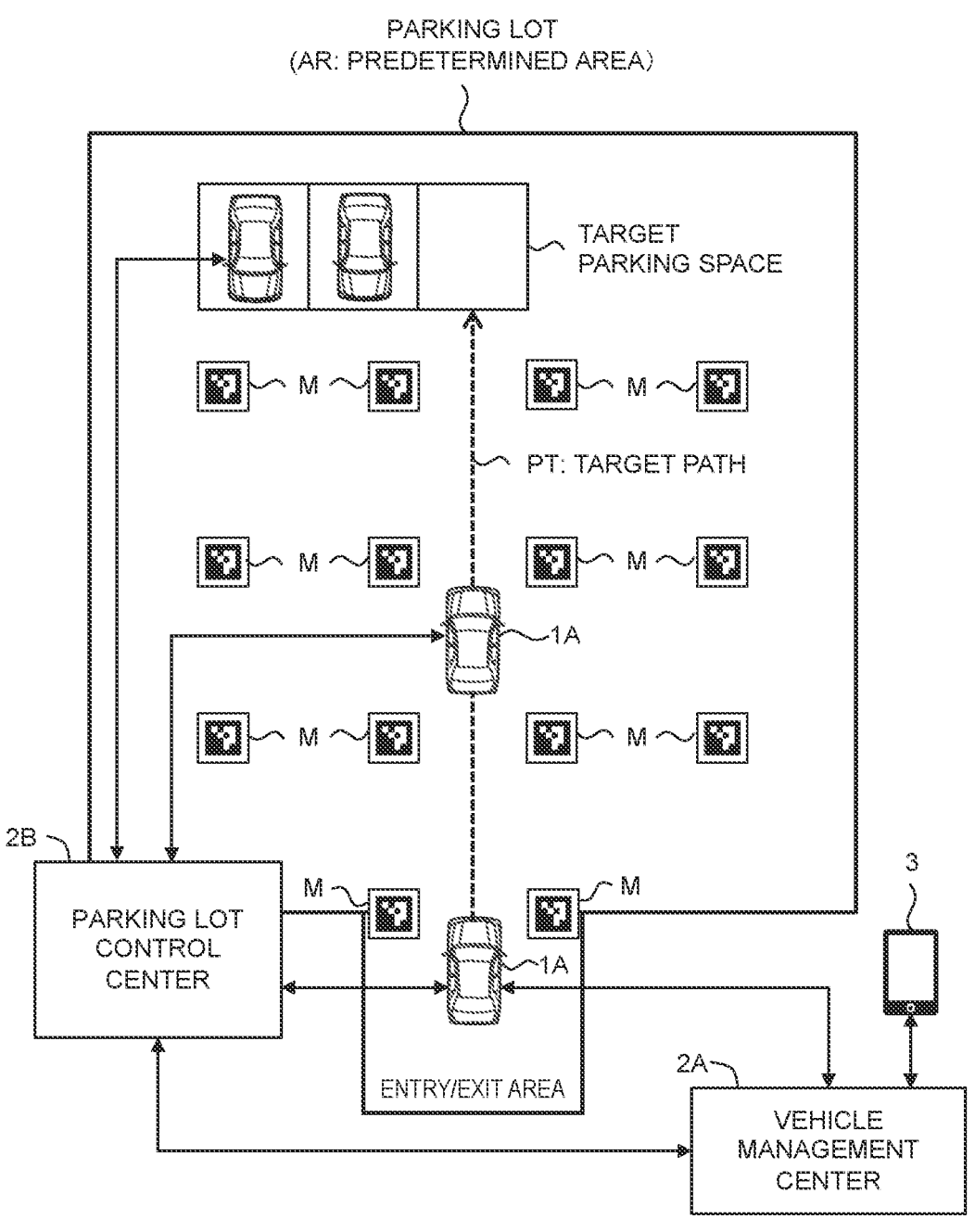
FIG. 3 is a conceptual diagram for explaining automated valet parking.

FIG. 3 is a conceptual diagram for explaining automated valet parking (AVP). In this example, the predetermined area AR is a parking lot. The parking lot may be indoor or may be outdoor. A plurality of landmarks (markers) M are arranged in the parking lot. Identification information is given to each landmark M.

An AVP vehicle 1A is the vehicle 1 that supports the automated valet parking in the parking lot. The AVP vehicle 1A is able to automatically travel at least in the parking lot. More specifically, the AVP vehicle 1A is provided with a recognition sensor (e.g., a camera) for recognizing a surrounding situation. The AVP vehicle 1A automatically travels in the parking lot while recognizing the surrounding situation by using the recognition sensor.

For example, the AVP vehicle 1A uses a camera to acquire an image indicating a situation around the AVP vehicle 1A, and recognizes the landmark M based on the image. The AVP vehicle 1A is able to recognize an entry area based on a result of recognition of the landmark M. Moreover, the AVP vehicle 1A performs "localization process (self-position estimation process, localization)" that estimates a position of the AVP vehicle 1A in the parking lot with high accuracy on the basis of the result of recognition of the landmark M. More specifically, the AVP vehicle 1A estimates its position with high accuracy by combining the result of recognition of the landmark M based on the camera and map information of the landmarks M in the parking lot. A target path PT is a path of movement from the entry area to a target parking space allocated to the AVP vehicle 1A. Based on the position of the AVP vehicle 1A estimated by the localization process and the target path PT, the AVP vehicle 1A performs autonomous travel so as to follow the target path PT. This enables the AVP vehicle 1A to automatically move from the entry area to the target parking space.

The management system 2 manages the automated valet parking in the parking lot. The management system 2 is capable of communicating with vehicles including the AVP vehicle 1A in the parking lot. For example, the management system 2 issues the remote instruction INS to the AVP vehicle 1A. For example, the remote instruction INS instructs to power on or off the AVP vehicle 1A. As another example, the remote instruction INS instructs to start the autonomous travel. The management system 2 may provide the AVP vehicle 1A with map information of the landmarks M in the parking lot. The management system 2 may allocate a parking space to the AVP vehicle 1A. The management system 2 may generate the target path PT from the entry area to the allocated parking space and provide the AVP vehicle 1A with information on the target path PT. The management system 2 may grasp respective positions of the vehicles including the AVP vehicle 1A in the parking lot. The management system 2 may remotely operate the AVP vehicle 1A in the parking lot.

As shown in FIG. 3, the management system 2 may include a vehicle management center 2A and a parking lot control center 2B. The parking lot control center 2B is installed for each parking lot. For example, the parking lot control center 2B grasps a situation of the parking lot, allocates a parking space to the AVP vehicle 1A, generates the target path PT, provides the AVP vehicle 1A with the information on the target path PT, and so forth.

The vehicle management center 2A controls parking lot control centers 2B of a large number of parking lots. For that purpose, the vehicle management center 2A communicates with each parking lot control center 2B to collect a variety of information and provide a variety of information. In addition, the vehicle management center 2A manages the AVP vehicle 1A, and transmits the remote instruction INS to the AVP vehicle 1A as necessary. Furthermore, the vehicle management center 2A manages users and reservations of an automated valet parking service. The vehicle management center 2A may communicate with a user terminal 3 operated by a user of the automated valet parking service.

Hereinafter, an example of a flow when a user uses the automated valet parking service will be described. It is assumed that member information of the user is registered in advance in the vehicle management center 2A.

First, the user makes a reservation of the automated valet parking service. For example, the user operates the user terminal 3 to input ID information of the user, a desired parking lot, a desired date of use, a desired time of use (i.e., a desired entry time and a desired exit time), and the like.

The user terminal 3 sends reservation information including the input information to the vehicle management center 2A. The vehicle management center 2A executes reservation processing based on the reservation information, and sends a reservation completion notification to the user terminal 3. In addition, the vehicle management center 2A sends authentication information associated with the reservation information to the user terminal 3. The user terminal 3 receives the authentication information and holds the received authentication information.

Entry (check-in) of the AVP vehicle 1A into the parking lot is as follows.

The AVP vehicle 1A with the user arrives and stops at the entry area (drop-off area) of the parking lot. At the entry area, the user (and other occupants if any) gets off the AVP vehicle 1A. Then, the user requests the entry of the AVP vehicle 1A by using the authentication information held in the user terminal 3. In response to the entry request, the vehicle management center 2A conducts authentication of the user. Upon completion of the authentication, authority to operate the AVP vehicle 1A is transferred from the user to the vehicle management center 2A. The vehicle management center 2A executes entry processing with regard to the AVP vehicle 1A.

In the entry processing, the vehicle management center 2A communicates with the AVP vehicle 1A to transmit the remote instruction INS that instructs to power on the AVP vehicle 1A. The AVP vehicle 1A is automatically powered on in accordance with the received remote instruction INS.

The parking lot control center 2B refers to a utilization status of the parking lot to allocate an available parking space to the AVP vehicle 1A. Then, the parking lot control center 2B communicates with the AVP vehicle 1A to transmit, as the remote instruction INS, an entry instruction that instructs the AVP vehicle 1A to start the autonomous travel. The entry instruction includes information of the target parking space allocated to the AVP vehicle 1A and map information of the parking lot. The entry instruction may include information on the target path PT from the entry area to the target parking space.

In response to the entry instruction, the AVP vehicle 1A starts the autonomous travel. The AVP vehicle 1A automatically travels from the entry area to the target parking space and automatically parks in the target parking space. At this time, the AVP vehicle 1A may travel along the target path PT specified by the parking lot control center 2B. The parking lot control center 2B may communicate with the AVP vehicle 1A to remotely control the autonomous travel of the AVP vehicle 1A.

Upon completion of the parking, the AVP vehicle 1A notifies the vehicle management center 2A of the parking completion. Alternatively, the parking lot control center 2B may use an infrastructure sensor installed in the parking lot to detect completion of the parking of the AVP vehicle 1A and notify the vehicle management center 2A of the parking completion. After the parking is completed, the vehicle management center 2A communicates with the AVP vehicle 1A to transmit the remote instruction INS that instructs to power off the AVP vehicle 1A. The AVP vehicle 1A is automatically powered off in accordance with the received remote instruction INS.

Exit (check-out) of the AVP vehicle 1A from the parking lot is as follows.

The user uses the user terminal 3 to request exit of the AVP vehicle 1A. The exit request includes authentication information. The exit request may include information of an exit area (pick-up area) specified by the user. In response to the exit request, the vehicle management center 2A conducts authentication of the user. Upon completion of the authentication, the vehicle management center 2A executes exit processing with regard to the AVP vehicle 1A.

In the exit processing, the vehicle management center 2A communicates with the AVP vehicle 1A to transmit the remote instruction INS that instructs to power on the AVP vehicle 1A. The AVP vehicle 1A is automatically powered on in accordance with the received remote instruction INS.

The parking lot control center 2B communicates with the AVP vehicle 1A to transmit, as the remote instruction INS, an exit instruction that instructs the AVP vehicle 1A to start the autonomous travel. The exit instruction includes information of the exit area (pick-up area) and map information of the parking lot. The exit instruction may include information on the target path PT from the parking space to the exit area (pick-up area).

In response to the exit instruction, the AVP vehicle 1A starts the autonomous travel. The AVP vehicle 1A automatically travels from parking space to the exit area. At this time, the AVP vehicle 1A may travel along the target path PT specified by the parking lot control center 2B. The parking lot control center 2B may communicate with the AVP vehicle 1A to remotely control the autonomous travel of the AVP vehicle 1A.

The AVP vehicle 1A arrives and stops at the exit area. The authority to operate the AVP vehicle 1A is transferred from the vehicle management center 2A to the user. The user (and other occupants if any) gets on the AVP vehicle 1A. The AVP vehicle 1A departs to a next destination.

As described above, at the time of entry or exit, the AVP vehicle 1A receives the remote instruction INS instructing to power on from the management system 2. The AVP vehicle 1A is automatically powered on in accordance with the received remote instruction INS and then starts the autonomous travel in the parking lot.

1-3. Mobility Service

Figure 4:
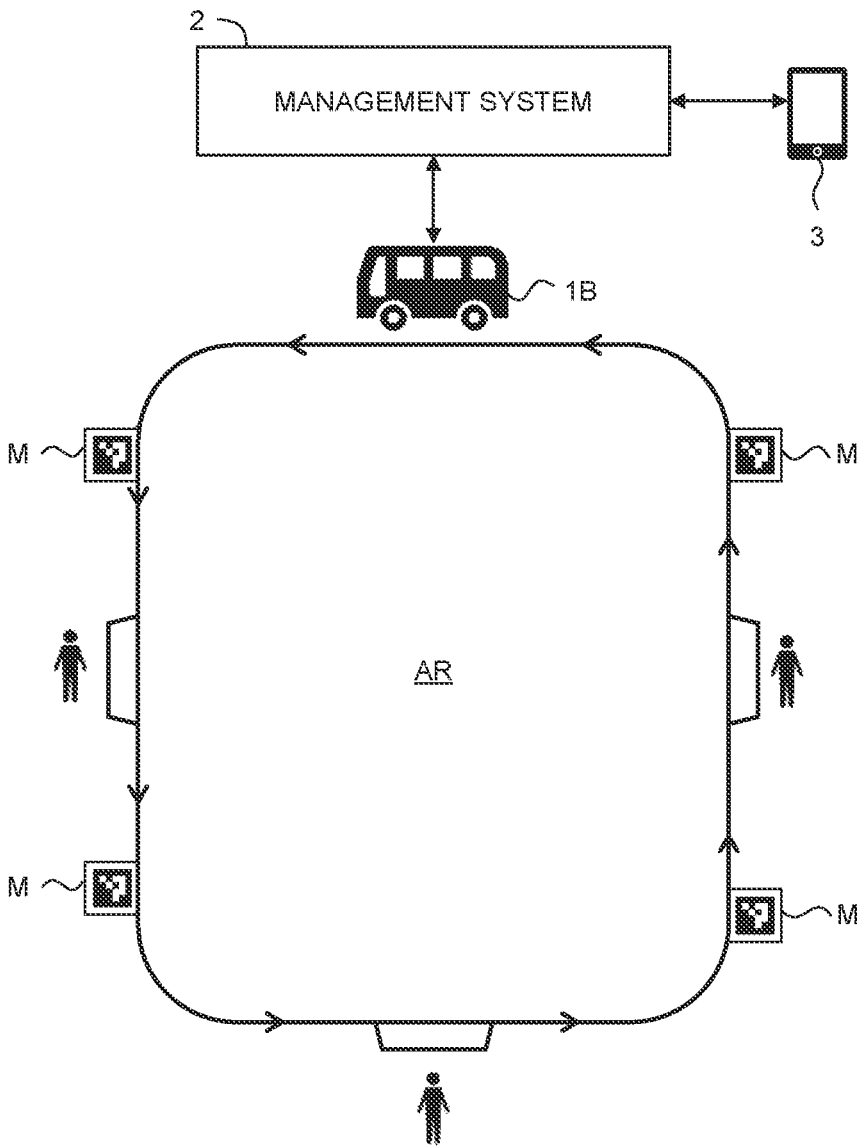
FIG. 4 is a conceptual diagram for explaining a mobility service.

FIG. 4 is a conceptual diagram for explaining a mobility service in the predetermined area AR. The predetermined area AR is an area in which the mobility service is provided. For example, the predetermined area AR is a city such as a "smart city" or a part of the city.

A mobility service vehicle 1B is the vehicle 1 for providing the mobility service in the predetermined area AR. Examples of the mobility service vehicle 1B include a bus, a taxi, a shared car, and the like. Examples of the bus include a route bus, a sightseeing bus, an on-demand bus, a semi-demand bus, and the like.

Typically, the mobility service vehicle 1B performs autonomous travel (autonomous driving) in the predetermined area AR. More specifically, the mobility service vehicle 1B is provided with a recognition sensor (for example, a camera) for recognizing a surrounding situation. The mobility service vehicle 1B performs the autonomous travel in the predetermined area AR while recognizing the surrounding situation using the recognition sensor.

Landmarks (markers) M used for the localization process may be arranged in the predetermined area AR. The mobility service vehicle 1B uses a camera to acquire an image indicating a situation around the mobility service vehicle 1B and recognizes the landmark M based on the acquired image. The mobility service vehicle 1B performs the localization process based on a result of recognition of the landmark M to estimate the self-position in the predetermined area AR. The mobility service vehicle 1B performs the autonomous travel based on the estimated self-position.

The management system 2 manages the mobility service and each mobility service vehicle 1B in the predetermined area AR. The management system 2 is capable of communicating with each mobility service vehicle 1B in the predetermined area AR. For example, the management system 2 communicates with each mobility service vehicle 1B to collect information on a position and a state of each mobility service vehicle 1B. In addition, the management system 2 issues the remote instruction INS to the mobility service vehicle 1B, as necessary. For example, the remote instruction INS instructs to power on or off the mobility service vehicle 1B. As another example, the remote instruction INS may remotely instruct the mobility service vehicle 1B to perform at least one of steering, acceleration, and deceleration. Furthermore, the management system 2 manages users and reservations of the mobility service. The management system 2 may communicate with a user terminal 3 operated by a user of the mobility service.

1-4. Other Examples

The vehicle 1 may be a robot that autonomously travel in the predetermined area AR. For example, the vehicle 1 is a logistics robot that automatically transports a package in the predetermined area AR such as a city, a warehouse, a factory, and the like. As another example, the vehicle 1 may be a work robot that performs predetermined work in the predetermined area AR such as a warehouse, a factory, and the like.

2. Issues

As described above, the vehicle 1 according to the present embodiment has the function of operating in accordance with the remote instruction INS in the predetermined area AR. Such the function is useful in providing services using the vehicle 1.

However, since the vehicle 1 has the function of operating in accordance with the remote instruction INS, there is a possibility that the function is abused. That is, there is a possibility that someone with malicious intent fakes a remote instruction INS and issues the fake remote instruction INS to operate (hijack) the vehicle 1 without permission. For the sake of convenience, the remote instruction INS faked will be hereinafter referred to as a "fake remote instruction INS-F." A person who maliciously issues the fake remote instruction INS-F to the vehicle 1 is hereinafter referred to as a "fake remote instruction issuer X."

Figure 5:
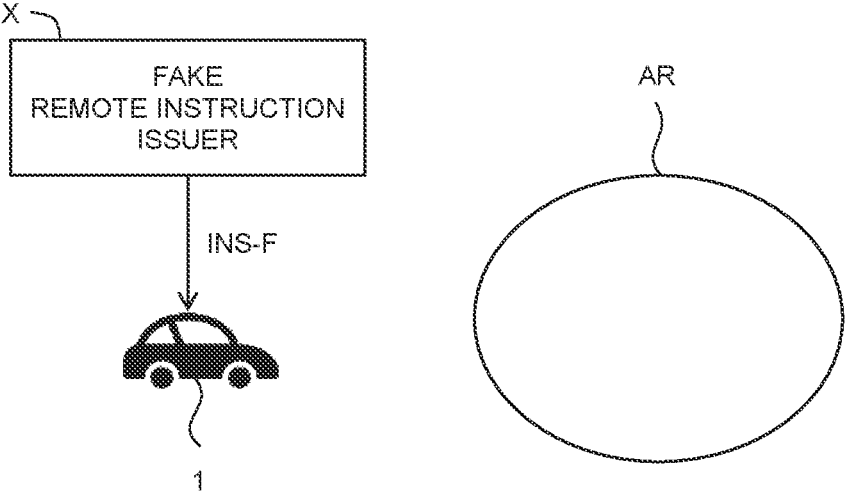
FIG. 5 is a conceptual diagram for explaining a first problem.

FIG. 5 shows a case where the vehicle 1 is outside the predetermined area AR. Basically, the management system 2 transmits the remote instruction INS to the vehicle 1 when the vehicle 1 is within the predetermined area AR. When the vehicle 1 is outside the predetermined area AR, the management system 2 does not transmit the remote instruction INS to the vehicle 1. For example, the AVP vehicle 1A (see FIG. 3) supporting the automated valet parking operates in accordance with the remote instruction INS in the parking lot, but is driven by a user outside the parking lot. Outside the parking lot, the AVP vehicle 1A never receives the remote instruction INS from the management system 2.

However, since the vehicle 1 has the function of receiving the remote instruction INS, it is possible to give the remote instruction INS to the vehicle 1 located outside the predetermined area AR. Therefore, the fake remote instruction issuer X may issue the fake remote instruction INS-F to the vehicle 1 located outside the predetermined area AR. The fake remote instruction issuer X can operate (hijack) the vehicle 1 without permission by giving the fake remote instruction INS-F. For example, it is conceivable that the fake remote instruction issuer X powers on the AVP vehicle 1A (see FIG. 3) located outside the parking lot, unlocks its door, and steals the AVP vehicle 1A. As another example, it is also conceivable that the fake remote instruction issuer X hijacks the AVP vehicle 1A located outside a parking lot and makes the AVP vehicle 1A automatically travel outside the parking lot to cause an accident.

Figure 6:
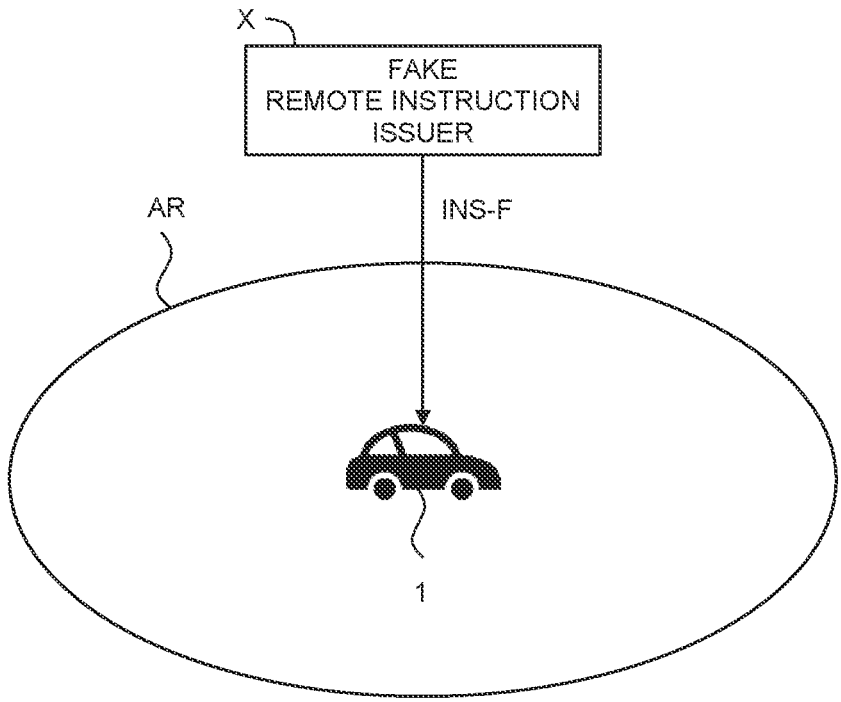
FIG. 6 is a conceptual diagram for explaining a second problem.

FIG. 6 shows a case where the vehicle 1 is in the predetermined area AR. The same applies to the case where the vehicle 1 is in the predetermined area AR. The fake remote instruction issuer X can operate (hijack) the vehicle 1 in the predetermined area AR without permission by giving the fake remote instruction INS-F. For example, it is conceivable that the fake remote instruction issuer X powers on the mobility service vehicle 1B (see FIG. 4) waiting in a waiting area, unlocks its door, and steals the mobility service vehicle 1B. As another example, it is also conceivable that the fake remote instruction issuer X hijacks the mobility service vehicle 1B in service and causes an accident. As still another example, it is also conceivable that the fake remote instruction issuer X powers on the AVP vehicle 1A (see FIG. 3) located within a parking lot and makes the AVP vehicle 1A automatically travel in the parking lot to cause an accident.

In view of the above, the present embodiment provides a technique capable of suppressing the abuse of the function of the vehicle 1 that operates in accordance with the remote instruction INS in the predetermined area AR.

3. Remote Instruction Verification Process and Operation Limiting Process

According to the present embodiment, when the vehicle 1 receives a remote instruction INS (this may be a fake remote instruction INS-F), verification (validation) of the received remote instruction INS is performed. Verifying the remote instruction INS means determining whether or not the remote instruction INS is valid. In other words, verifying the remote instruction INS means determining whether the remote instruction INS is a valid remote instruction INS transmitted from the management system 2 or a fake remote instruction INS-F. The process of verifying the remote instruction INS received by the vehicle 1 is hereinafter referred to as a "remote instruction verification process."

Figure 7:
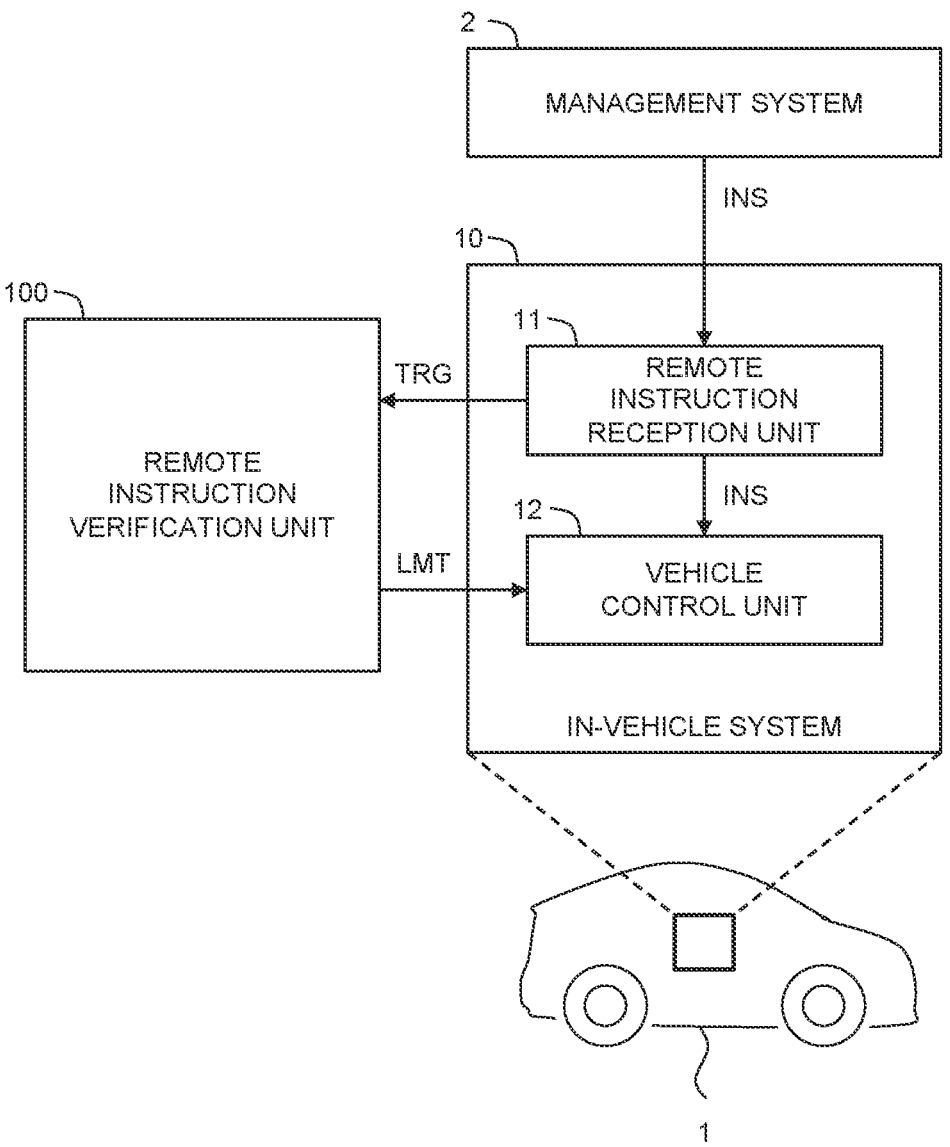
FIG. 7 is a block diagram for explaining an overview of a remote instruction verification process according to an embodiment.

FIG. 7 is a block diagram for explaining an overview of the remote instruction verification process according to the present embodiment. A remote instruction verification unit 100 performs the remote instruction verification process. For example, the remote instruction verification unit 100 is included in the in-vehicle system 10 of the vehicle 1. As another example, the remote instruction verification unit 100 may be included in the management system 2. As still another example, the remote instruction verification unit 100 may be distributed to the in-vehicle system 10 and the management system 2.

Figure 8:
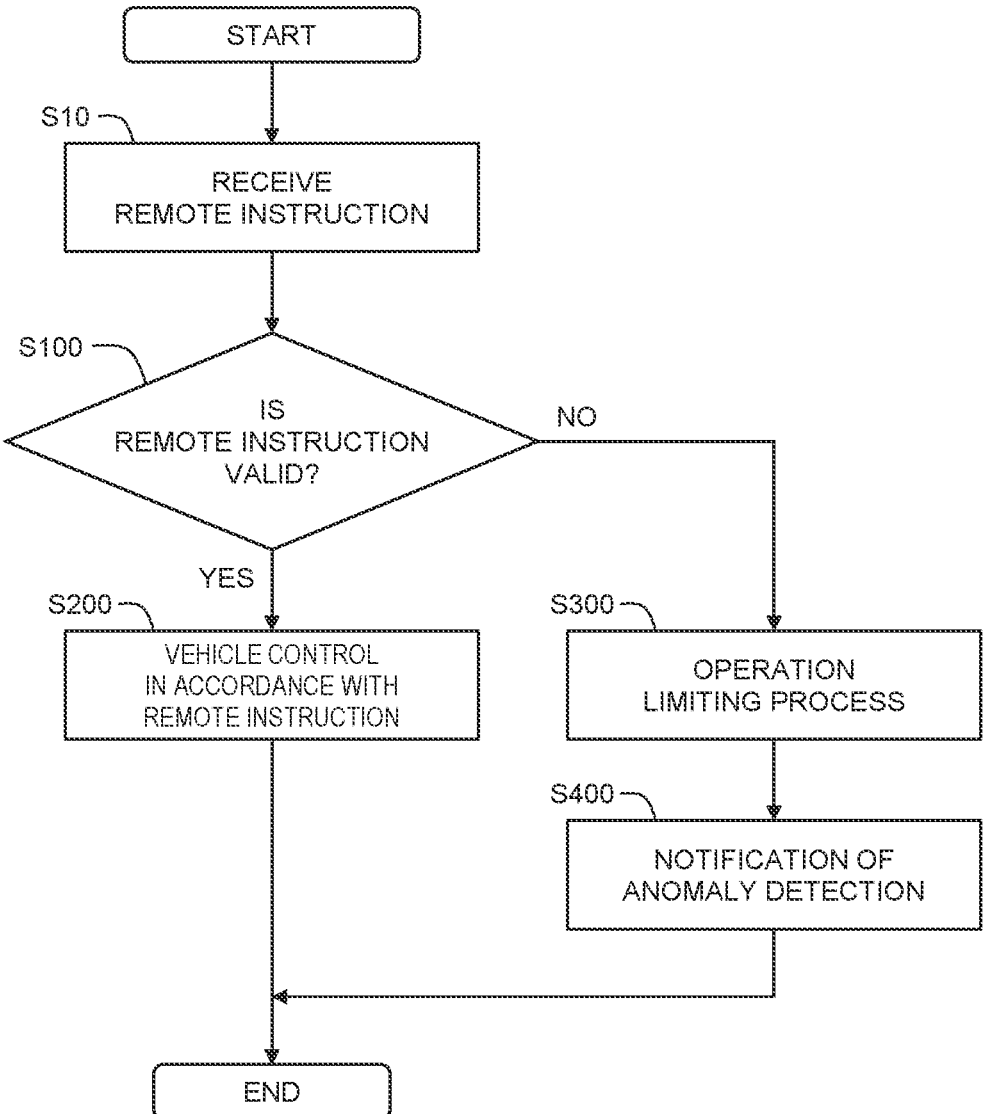
FIG. 8 is a flowchart showing processing related to a remote instruction verification process according to an embodiment.

FIG. 8 is a flowchart showing processing related to the remote instruction verification process according to the present embodiment.

In Step S10, the remote instruction reception unit 11 of the in-vehicle system 10 receives a remote instruction INS (this may be a fake remote instruction INS-F). Upon receiving the remote instruction INS, the remote instruction reception unit 11 transmits a trigger signal TRG to the remote instruction verification unit 100. Thereafter, the processing proceeds to Step S100.

It should be noted that when the received remote instruction INS instructs to power on the vehicle 1, the vehicle control unit 12 may temporarily power on the vehicle 1. In this case, the vehicle control unit 12 waits without performing other processing until a result of the remote instruction verification process is available.

In Step S100, the remote instruction verification unit 100 receives the trigger signal TRG. In response to the trigger signal TRG, the remote instruction verification unit 100 performs the remote instruction verification process that determines whether or not the remote instruction INS received by the in-vehicle system 10 is valid. Various examples can be considered as a concrete method of the remote instruction verification process. Various examples of the remote instruction verification processes will be described later.

When the remote instruction INS received by the in-vehicle system 10 is valid (Step S100; Yes), the processing proceeds to Step S200. In Step S200, the remote instruction verification unit 100 notifies the vehicle control unit 12 of the fact that the remote instruction INS is valid. The vehicle control unit 12 controls the vehicle 1 in accordance with the received remote instruction INS as usual.

On the other hand, when the remote instruction INS received by the in-vehicle system 10 is invalid, that is, when it is determined that the received remote instruction INS is the fake remote instruction INS-F (Step S100; No), the processing proceeds to Step S300.

In Step S300, the remote instruction verification unit 100 performs an "operation limiting process." The operation limiting process is a process of limiting at least a part of the operation of the vehicle 1 without following the received remote instruction INS. More specifically, the remote instruction verification unit 100 transmits an operation limiting signal LMT to the vehicle control unit 12. The operation limiting signal LMT instructs to limit at least a part of the operation of the vehicle 1 without following the received remote instruction INS. The operation limiting signal LMT may include a content of the operation of the vehicle 1 to be limited. The vehicle control unit 12 limits at least a part of the operation of vehicle 1 in accordance with the operation limiting signal LMT. Examples of the operation limiting process are as follows.

A first example of the operation limiting process is to power off the vehicle 1. When the fake remote instruction INS-F instructs to power on the vehicle 1, the vehicle control unit 12 temporarily powers on the vehicle 1. After that, when receiving the operation limiting signal LMT instructing to power off, the vehicle control unit 12 immediately powers off the vehicle 1 to make the vehicle 1 inoperable. This can prevent theft of the vehicle 1 and accident occurrence.

A second example of the operation limiting process is to prohibit movement (travel) of the vehicle 1. Even if the fake remote instruction INS-F instructs to perform the autonomous travel the vehicle 1, the vehicle control unit 12 does not move the vehicle 1 at all. This can prevent theft of the vehicle 1 and accident occurrence. It should be noted that power supply to various devices mounted on the vehicle 1 may be continued while the movement of the vehicle 1 is prohibited.

A third example of the operation limiting process is to issue an alarm from the vehicle 1 while prohibiting the movement (travel) of the vehicle 1. For example, the vehicle control unit 12 turns on or blinks lights (e.g., a headlight, a hazard lamp) of the vehicle 1. As another example, the vehicle control unit 12 may blow a horn of the vehicle 1. As a result, it is possible to draw attention from the surroundings of the vehicle 1 while preventing theft of the vehicle 1 and accident occurrence.

A fourth example of the operation limiting process is to prohibit unlocking of a door of the vehicle 1. As a result, intrusion into the vehicle 1 is prevented.

A fifth example of the operation limiting process relates to a case where the fake remote instruction INS-F is received when the vehicle 1 is in motion. More specifically, the fifth example of the operation limiting process is to immediately decelerate and stop the vehicle 1. As a result, an occurrence of an accident is suppressed.

A combination of two or more of the first to fifth examples of the operation limiting process is also possible.

In Step S400, the remote instruction verification unit 100 notifies the management system 2 of the anomaly detection. The management system 2 notifies the user terminal 3 of the anomaly detection.

As described above, according to the present embodiment, when the vehicle 1 receives the remote instruction INS, the remote instruction verification process is performed to determine whether or not the remote instruction INS is valid. When the remote instruction INS received by the vehicle 1 is invalid, the operation limiting process that limits at least a part of the operation of the vehicle 1 without following the remote instruction INS is performed. This makes it possible to suppress the abuse of the function of the vehicle 1 that operates in accordance with the remote instruction INS. In other words, it is possible to suppress the hijacking of the vehicle 1 by the fake remote instruction issuer X. As a result, for example, theft of the vehicle 1 and accident occurrence are suppressed.

Hereinafter, various examples of the remote instruction verification process (Step S100) according to the present embodiment will be described.

3-1. Area Verification Process

Basically, the management system 2 transmits the remote instruction INS to the vehicle 1 when the vehicle 1 is within the predetermined area AR. When the vehicle 1 is outside the predetermined area AR, the management system 2 does not transmit the remote instruction INS to the vehicle 1. For example, the AVP vehicle 1A (see FIG. 3) supporting the automated valet parking operates in accordance with the remote instruction INS in the parking lot, but is driven by a user outside the parking lot. Outside the parking lot, the AVP vehicle 1A never receives the remote instruction INS from the management system 2. If a remote instruction INS is received when the vehicle 1 is located outside the predetermined area AR, the remote instruction INS is highly likely to be not a valid remote instruction transmitted from the management system 2 but the fake remote instruction INS-F.

From the above point of view, as an example of the remote instruction verification process, determining whether or not the vehicle 1 is present in the predetermined area AR at a time when the vehicle 1 receives the remote instruction INS is considered. A process of determining whether or not the vehicle 1 is present in the predetermined area AR at the time when the vehicle 1 receives the remote instruction INS is hereinafter referred to as an "area verification process."

Figure 9:
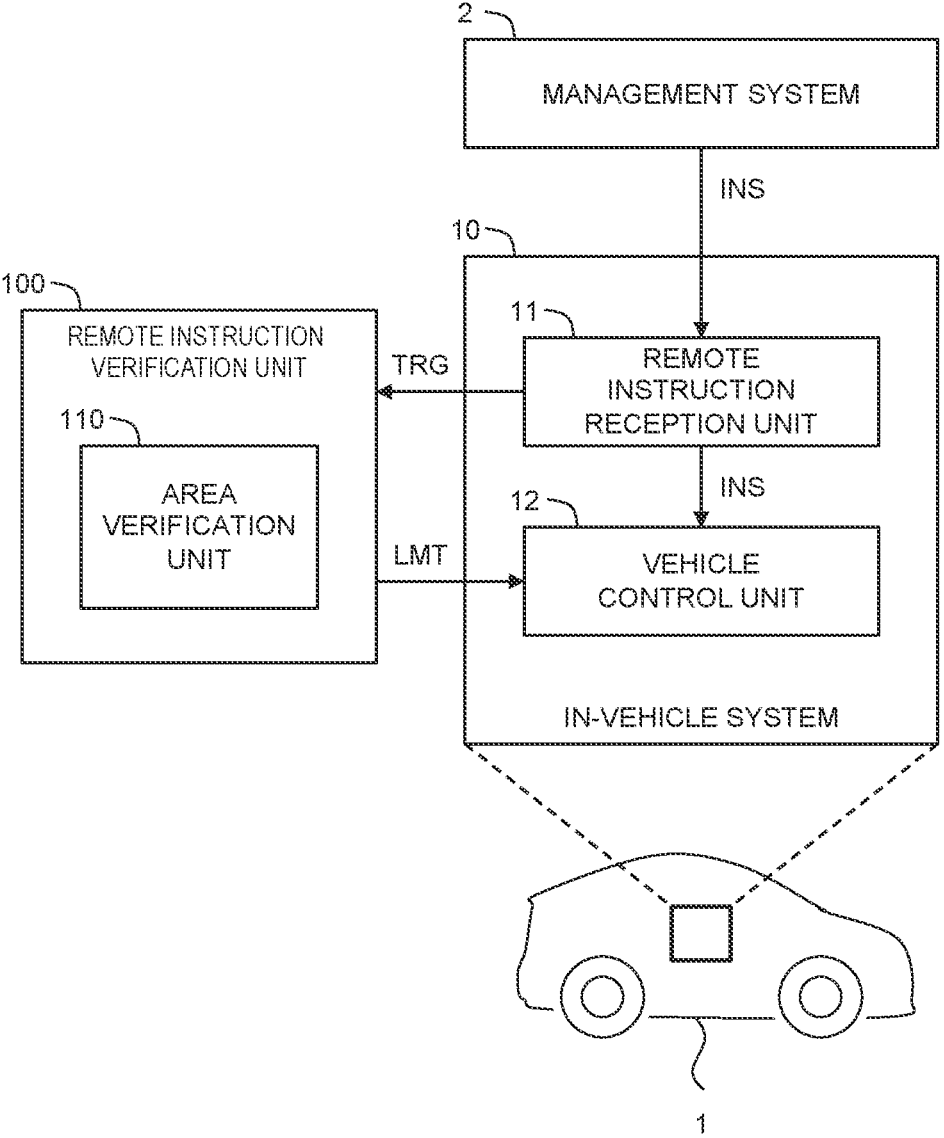
FIG. 9 is a block diagram for explaining an area verification unit that performs an area verification process according to an embodiment.

As shown in FIG. 9, the remote instruction verification unit 100 includes an area verification unit 110. The area verification unit 110 performs the area verification process in response to the trigger signal TRG. If the vehicle 1 is not present in the predetermined area AR at the time when the vehicle 1 receives the remote instruction INS, the area verification unit 110 determines that the received remote instruction INS is invalid.

Figure 10:
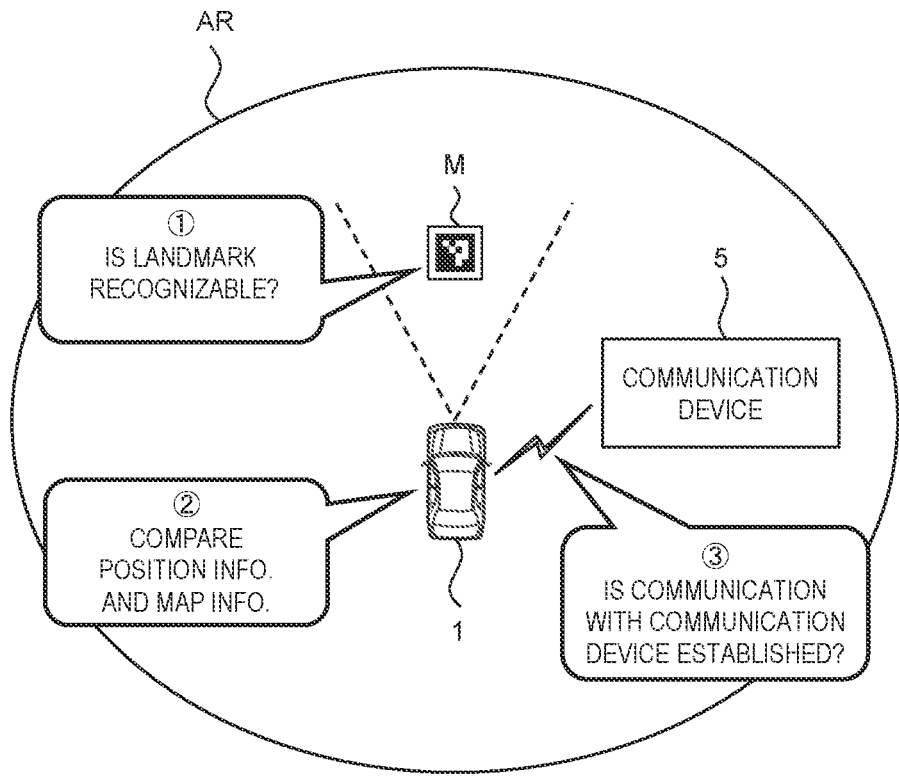
FIG. 10 is a conceptual diagram for explaining various examples of an area verification process according to an embodiment.

FIG. 10 is a conceptual diagram for explaining various examples of the area verification process.

3-1-1. First Example

A first example of the area verification process is to determine whether or not a landmark M arranged in the predetermined area AR is recognizable from a position of the vehicle 1. When the landmark M is not recognizable from the position of the vehicle 1, the area verification unit 110 determines that the vehicle 1 is not present in the predetermined area AR.

For example, the vehicle 1 (the in-vehicle system 10) is configured to recognize the landmark M around the vehicle 1 by using a recognition sensor such as a camera and the like mounted on the vehicle 1. The area verification unit 110 included in the in-vehicle system 10 determines whether or not the in-vehicle system 10 recognizes the landmark M around the vehicle 1. When the in-vehicle system 10 does not recognize the landmark M, the area verification unit 110 determines that the landmark M is not recognizable from the position of the vehicle 1. That is, the area verification unit 110 determines that the vehicle 1 is not present in the predetermined area AR.

As another example, the vehicle 1 (the in-vehicle system 10) transmits image information captured by the camera mounted on the vehicle 1 to the management system 2. The management system 2 is configured to recognize the landmark M around the vehicle 1 based on the image information received from the vehicle 1. The area verification unit 110 included in the management system 2 determines whether or not the management system 2 recognizes the landmark M around the vehicle 1. When the management system 2 does not recognize the landmark M, the area verification unit 110 determines that the landmark M is not recognizable from the position of the vehicle 1. That is, the area verification unit 110 determines that the vehicle 1 is not present in the predetermined area AR.

3-1-2. Second Example

A second example of the area verification process is to compare the position information of the vehicle 1 with map information. A position of the predetermined area AR is registered in the map information. Therefore, comparing the position information of the vehicle 1 with the map information makes it possible to determine whether or not the vehicle 1 is present in the predetermined area AR.

For example, the in-vehicle system 10 acquires the position information of the vehicle 1 by using a position sensor such as a GPS and the like. Alternatively, the in-vehicle system 10 acquires the position information of the vehicle 1 by performing the localization process. The area verification unit 110 included in the in-vehicle system 10 acquires the position information of the vehicle 1 and compares the position information of the vehicle 1 with the map information to determine whether or not the vehicle 1 is present in the predetermined area AR.

As another example, the in-vehicle system 10 transmits the position information of the vehicle 1 to the management system 2. The management system 2 acquires the position information of the vehicle 1 from the in-vehicle system 10.

The area verification unit 110 included in the management system 2 acquires the position information of the vehicle 1 and compares the position information of the vehicle 1 with the map information to determine whether or not the vehicle 1 is present in the predetermined area AR.

3-1-3. Third Example

The vehicle 1 (the in-vehicle system 10) and a communication device 5 installed in the predetermined area AR are configured to communicate with each other in accordance with a specific communication scheme. For example, in the case of the automated valet parking shown in FIG. 3, the parking lot control center 2B corresponds to the communication device 5, and the AVP vehicle 1A in the parking lot and the parking lot control center 2B communicate with each other in accordance with a specific communication scheme. For example, the specific communication scheme is a short-range wireless communication scheme such as WiFi (registered trademark), Bluetooth (registered trademark), and the like.

A third example of the area verification process is to determine whether or not a communication is established between the vehicle 1 (the in-vehicle system 10) and the communication device 5 installed in the predetermined area AR. When the communication is not established between the vehicle 1 (the in-vehicle system 10) and the communication device 5, the area verification unit 110 determines that the vehicle 1 is not present in the predetermined area AR. The area verification unit 110 may be included in the in-vehicle system 10 or may be included in the communication device 5 included in the management system 2.

3-1-4. Processing Flow

Figure 11:
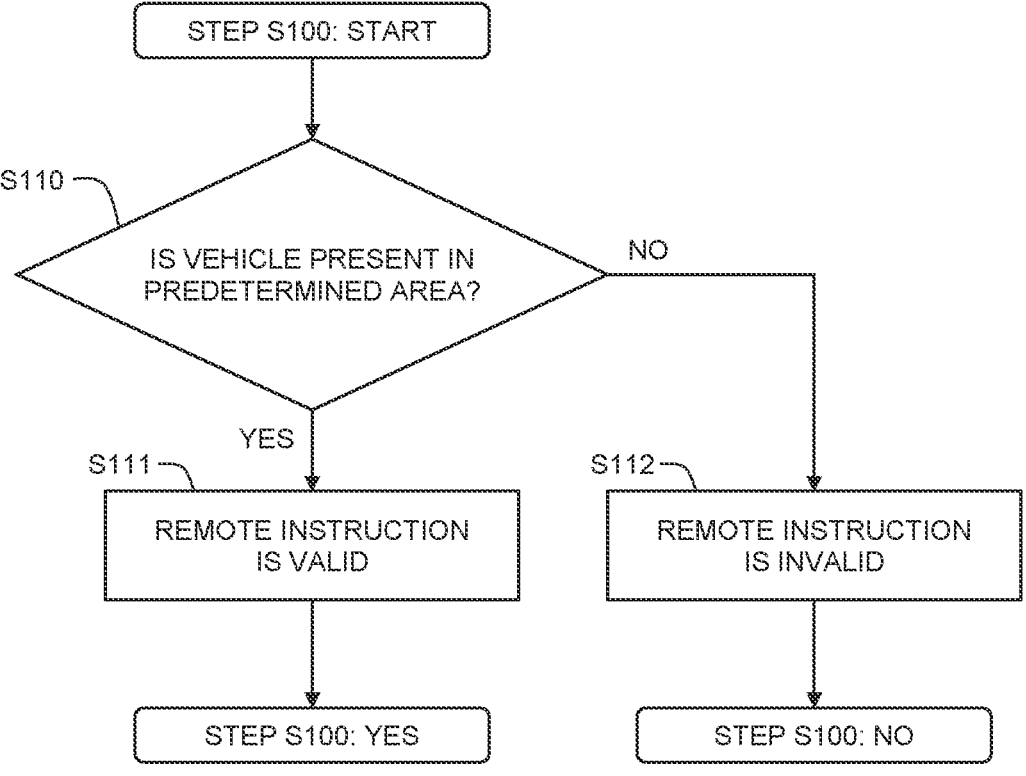
FIG. 11 is a flowchart summarizing an area verification process according to an embodiment.

FIG. 11 is a flowchart summarizing the area verification process performed by the area verification unit 110. The area verification unit 110 may be included in the in-vehicle system 10 or may be included in the management system 2. Alternatively, the area verification unit 110 may be distributed to the in-vehicle system 10 and the management system 2.

In Step S110, the area verification unit 110 determines whether or not the vehicle 1 is present in the predetermined area AR. When the vehicle 1 is present in the predetermined area AR (Step S110; Yes), the area verification unit 110 determines that the received remote instruction INS is valid (Step S111). On the other hand, when the vehicle 1 is not present in the predetermined area AR (Step S110; No), the area verification unit 110 determines that the received remote instruction INS is invalid (Step S112).

3-1-5. Effects

According to the area verification process described above, it is possible to solve the problem described in FIG. 5. That is, it is possible to suppress the hijacking of the vehicle 1 located outside the predetermined area AR by the fake remote instruction issuer X.

3-2. Source Verification Process

As another example of the remote instruction verification process, checking (confirming) whether or not the management system 2 has actually transmitted the remote instruction INS to the vehicle 1 is considered. A process of checking (confirming) whether or not the management system 2 has actually transmitted the remote instruction INS to the vehicle 1 is hereinafter referred to as a "source verification process."

Figure 12:
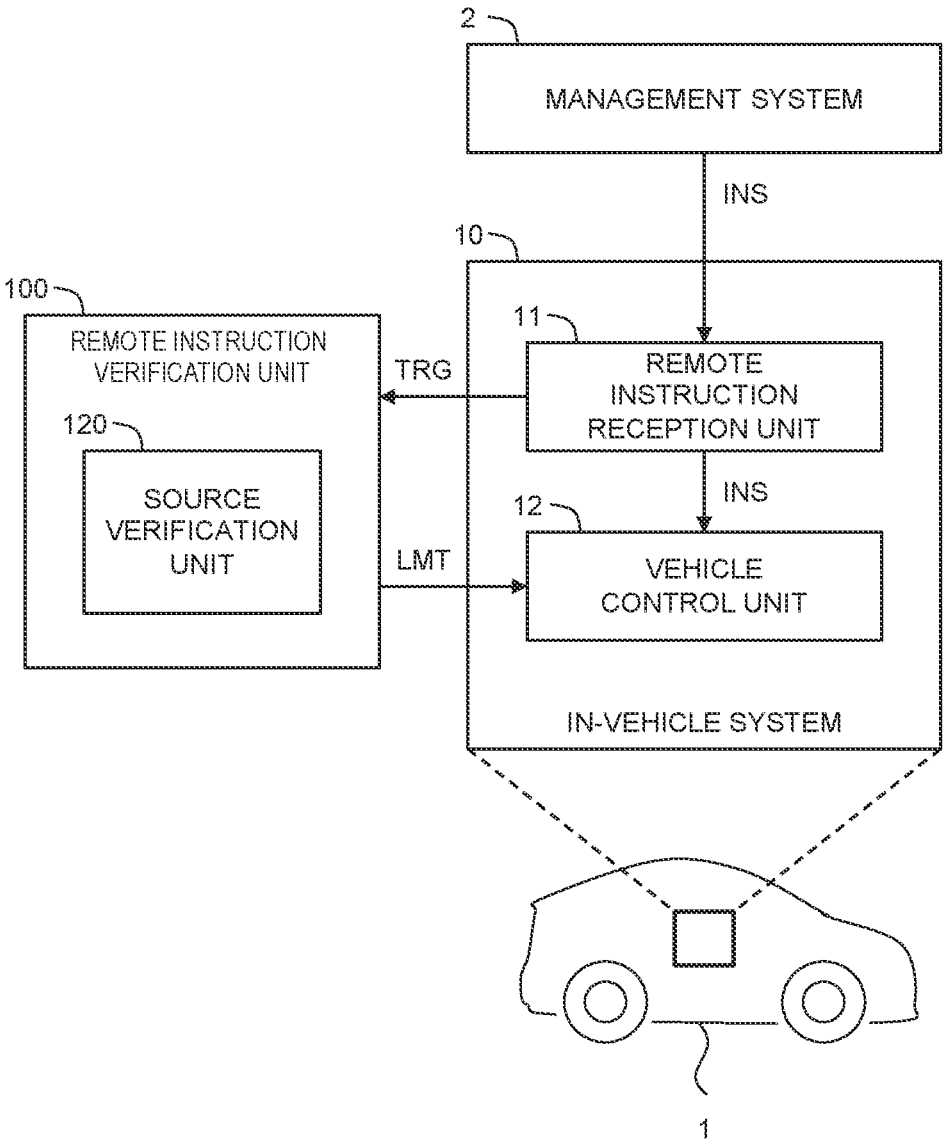
FIG. 12 is a block diagram for explaining a source verification unit that performs a source verification process according to an embodiment.

As shown in FIG. 12, the remote instruction verification unit 100 includes a source verification unit 120. The source verification unit 120 performs the source verification process in response to the trigger signal TRG. When the management system 2 has not actually transmitted the remote instruction INS to the vehicle 1, the source verification unit 120 determines that the received remote instruction INS is invalid.

Figure 13:
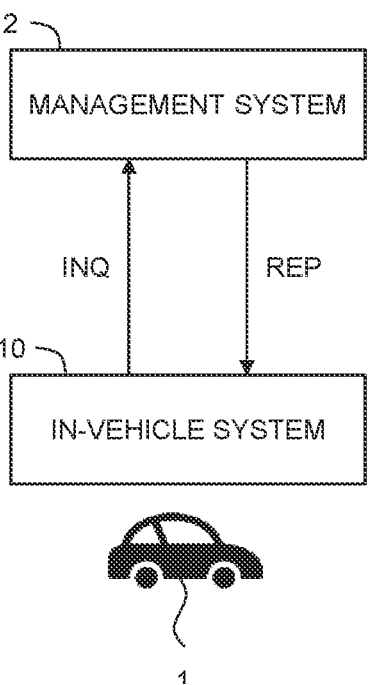
FIG. 13 is a conceptual diagram for explaining an example of a source verification process according to an embodiment.

FIG. 13 is a conceptual diagram for explaining an example of the source verification process. The source verification unit 120 is distributed to the in-vehicle system 10 and the management system 2. In response to the trigger signal TRG, the source verification unit 120 on the side of the in-vehicle system 10 transmits inquiry information INQ to the management system 2. The inquiry information INQ is information for inquiring whether or not the remote instruction INS has been actually transmitted to the vehicle 1. Upon receiving the inquiry information INQ, the source verification unit 120 on the side of the management system 2 checks whether or not the management system 2 has actually transmitted the remote instruction INS to the vehicle 1 being the inquiry source. Then, the source verification unit 120 on the side of the management system 2 returns reply information REP indicating the check result to the in-vehicle system 10. When the reply information REP indicates that there is no fact of transmission of the remote instruction INS, the source verification unit 120 on the side of the in-vehicle system 10 determines that the received remote instruction INS is invalid.

Figure 14:
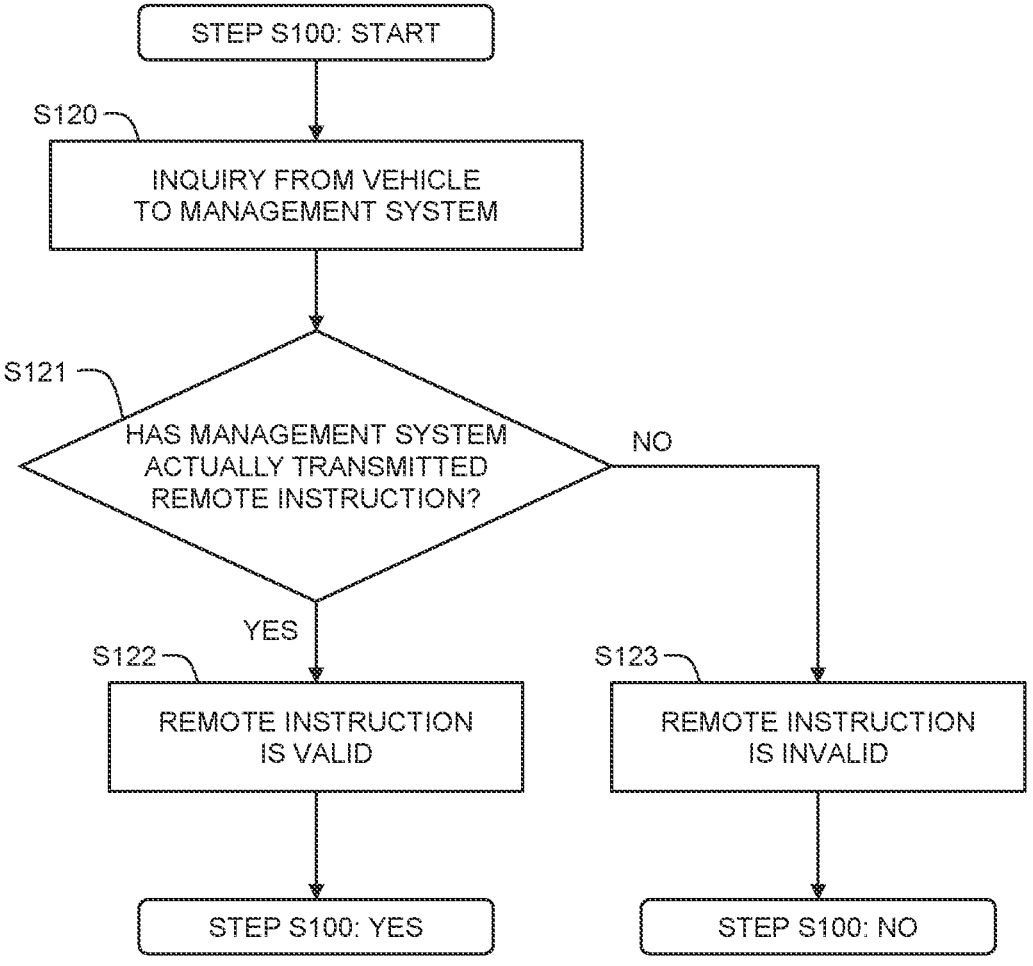
FIG. 14 is a flowchart summarizing a source verification process according to an embodiment.

As another example, when there is no fact of transmission of the remote instruction INS, the source verification unit 120 on the side of the management system 2 may determine that the remote instruction INS is invalid and generate the operation limiting signal LMT. In this case, the operation limiting signal LMT is included in the reply information REP transmitted from the management system 2 to the in-vehicle system 10. The vehicle control unit 12 of the in-vehicle system 10 performs the operation limiting process in accordance with the operation limiting signal LMT. FIG. 14 is a flowchart summarizing the source verification process performed by the source verification unit 120. The source verification unit 120 is distributed to the in-vehicle system 10 and the management system 2.

In Step S120, the source verification unit 120 on the side of the in-vehicle system 10 transmits the inquiry information INQ to the management system 2. In Step S121, the source verification unit 120 on the side of the management system 2 checks whether or not the management system 2 has actually transmitted the remote instruction INS to the vehicle 1. When the management system 2 has actually transmitted the remote instruction INS (Step S121; Yes), the source verification unit 120 determines that the received remote instruction INS is valid (Step S122). On the other hand, when the management system 2 has not actually transmitted the remote instruction INS (Step S121; No), the source verification unit 120 determines that the received remote instruction INS is invalid (Step S123).

According to the source verification process described above, it is possible to solve not only the problem described in FIG. 5 but also the problem described in FIG. 6. That is, it is possible to suppress the hijacking of the vehicle 1 by the fake remote instruction issuer X regardless of whether the vehicle 1 is inside or outside the predetermined area AR.

3-3. Recognition Result Verification Process

As described above, the landmarks M are arranged in the predetermined area AR. The vehicle 1 (the in-vehicle system 10) recognizes the landmark M around the vehicle 1 by using a recognition sensor such as a camera and the like mounted on the vehicle 1. Alternatively, the vehicle 1 (the in-vehicle system 10) transmits image information captured by the camera mounted on the vehicle 1 to the management system 2. Then, the management system 2 recognizes the landmark M around the vehicle 1 based on the image information received from the vehicle 1.

As described in the above Section 3-1-1, it is conceivable to determine whether or not the remote instruction INS is valid based on whether or not the landmark M is recognizable from the position of the vehicle 1. However, there is also a possibility that the fake remote instruction issuer X counterfeits the landmark M as well and makes the vehicle 1 recognize the counterfeit landmark M.

From the above point of view, as still another example of the remote instruction verification process, determining whether or not the landmark M itself recognized from the position of the vehicle 1 is valid is considered. A process of determining whether or not the landmark M itself recognized from the position of the vehicle 1 is valid is hereinafter referred to as a "recognition result verification process."

Figure 15:
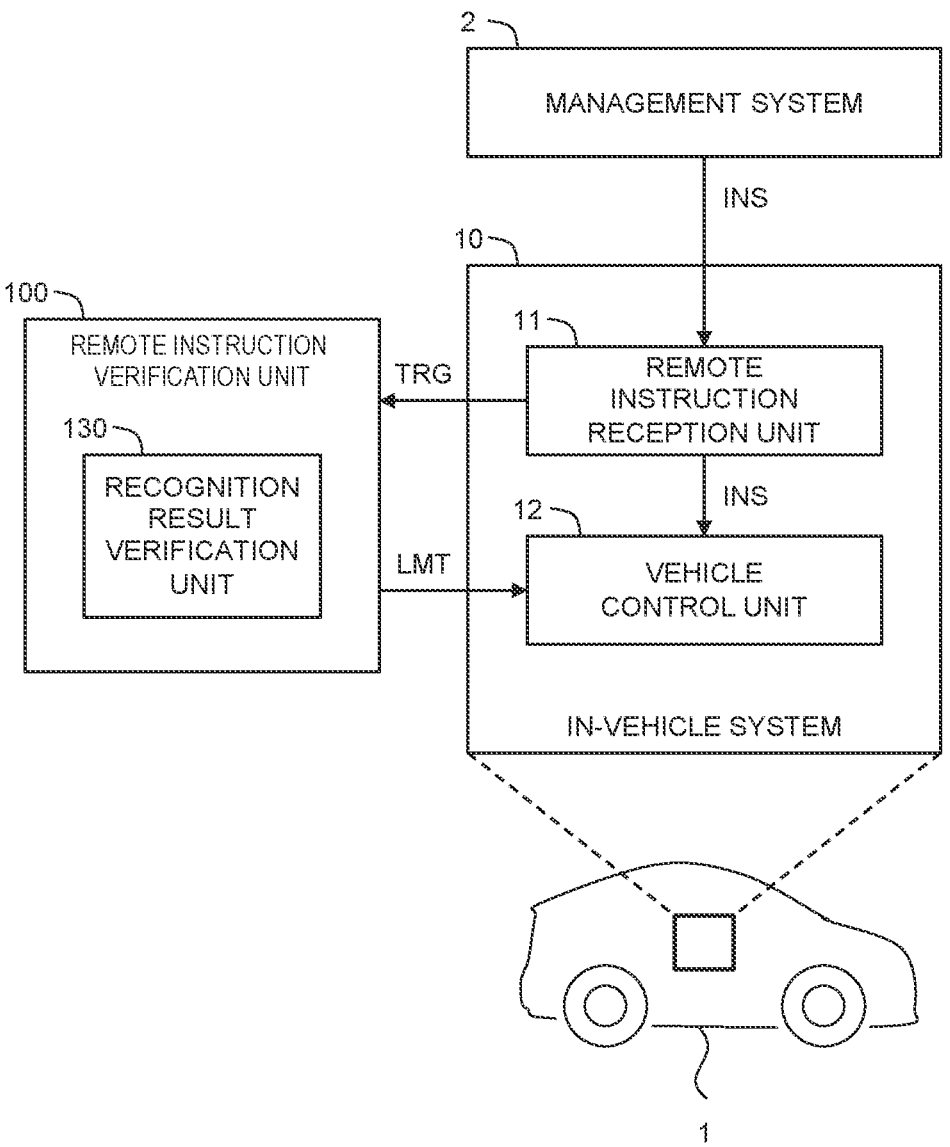
FIG. 15 is a block diagram for explaining a recognition result verification unit that performs a recognition result verification process according to an embodiment.

As shown in FIG. 15, the remote instruction verification unit 100 includes a recognition result verification unit 130. The recognition result verification unit 130 may be included in the in-vehicle system 10 or may be included in the management system 2. Alternatively, the recognition result verification unit 130 may be distributed to the in-vehicle system 10 and the management system 2.

Figure 16:
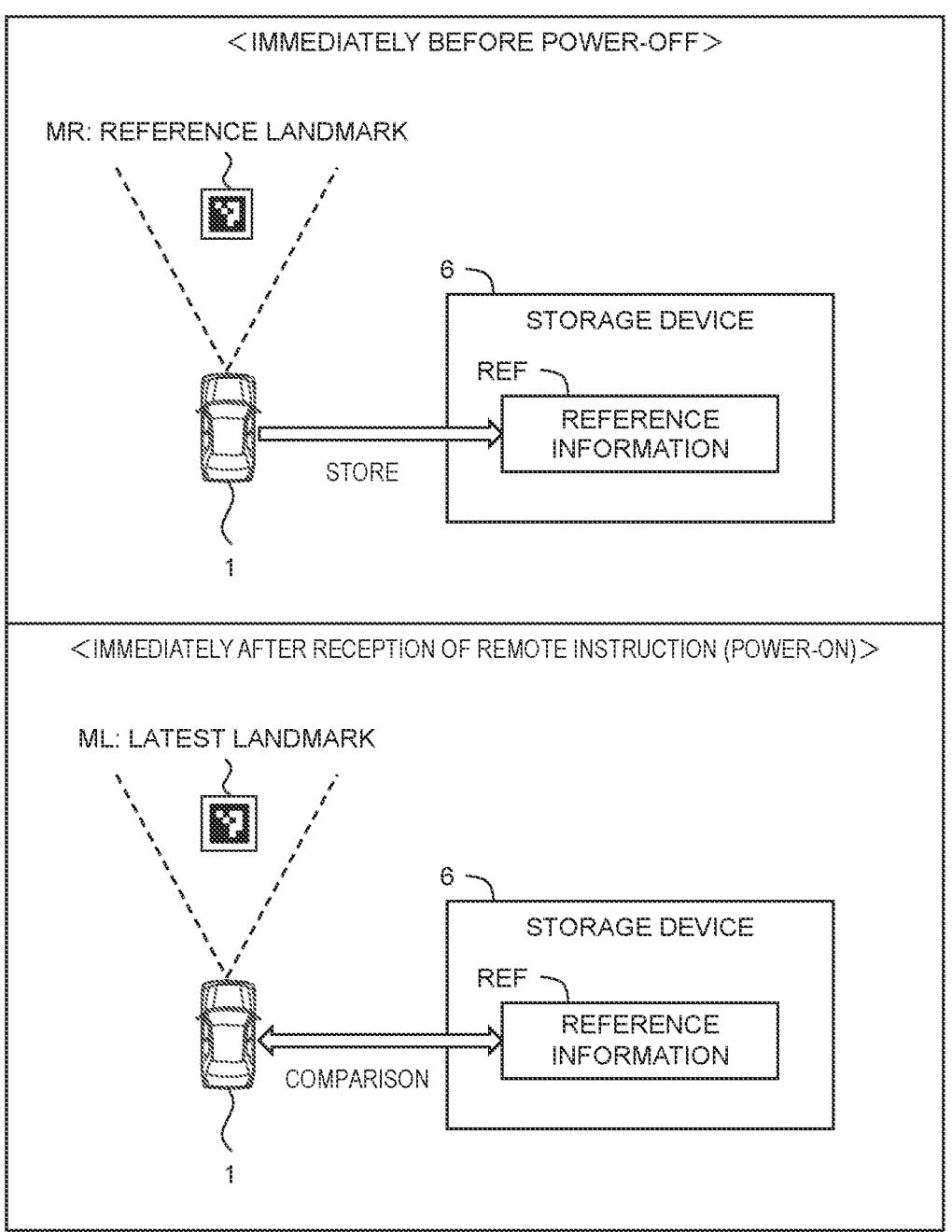
FIG. 16 is a conceptual diagram for explaining an example of a recognition result verification process according to an embodiment.

FIG. 16 is a conceptual diagram for explaining an example of the recognition result verification process. Here, it is assumed that the remote instruction INS is one instructing to power on the vehicle 1.

A "reference landmark MR" is a landmark M recognized from the position of the vehicle 1 immediately before the vehicle 1 is powered off. "Reference information REF" is information corresponding to the reference landmark MR. For example, the reference information REF includes identification information of the reference landmark MR. As another example, the reference information REF may include position information of the reference landmark MR. As still another example, the reference information REF may include a position and an orientation of the vehicle 1 when the reference landmark MR is recognized. The reason is that the reference landmark MR recognizable from the vehicle 1 can be identified based on map information of the landmarks M and the position and the orientation of the vehicle 1.

Immediately before the vehicle 1 is powered off, the recognition result verification unit 130 acquires the reference information REF and stores the reference information REF in a predetermined storage device 6. The predetermined storage device 6 may be installed on the vehicle 1 or may be included in the management system 2. For example, the recognition result verification unit 130 included in the in-vehicle system 10 acquires the reference information REF from the in-vehicle system 10 and stores the reference information REF in the predetermined storage device 6 installed on the vehicle 1. As another example, the recognition result verification unit 130 included in the in-vehicle system 10 may transmit the reference information REF to the management system 2, and the recognition result verification unit 130 included in the management system 2 may store the reference information REF in the predetermined storage device 6 of the management system 2. As still another example, the recognition result verification unit 130 included in the management system 2 may acquire the reference information REF from the management system 2 and store the reference information REF in the predetermined storage device 6 of the management system 2.

Thereafter, the in-vehicle system 10 receives the remote instruction INS that instructs to power on the vehicle 1. The recognition result verification unit 130 performs the recognition result verification process in response to the trigger signal TRG. A "latest landmark ML" is a landmark M recognized first from the position of the vehicle 1 after the power-on. The recognition result verification unit 130 acquires information on the latest landmark ML from the in-vehicle system 10 or the management system 2. The information on the latest landmark ML includes at least one of position information and identification information of the latest landmark ML.

Further, the recognition result verification unit 130 reads the above-described reference information REF from the predetermined storage device 6. The recognition result verification unit 130 acquires the information on the reference landmark MR based on the read reference information REF. The information on the reference landmark MR includes at least one of the position information and the identification information of the reference landmark MR. Then, the recognition result verification unit 130 determines whether or not the latest landmark ML is consistent with the reference landmark MR. When the latest landmark ML is not consistent with the reference landmark MR, the recognition result verification unit 130 determines that the received remote instruction INS is invalid.

In addition, when the latest landmark ML is not consistent with the reference landmark MR, the recognition result verification unit 130 can judge that the vehicle 1 is unintentionally moved during a period in which the vehicle 1 is powered off. That is, it is possible to detect anomaly occurrence (for example, theft) in the period when the vehicle 1 is powered off.

Figure 17:
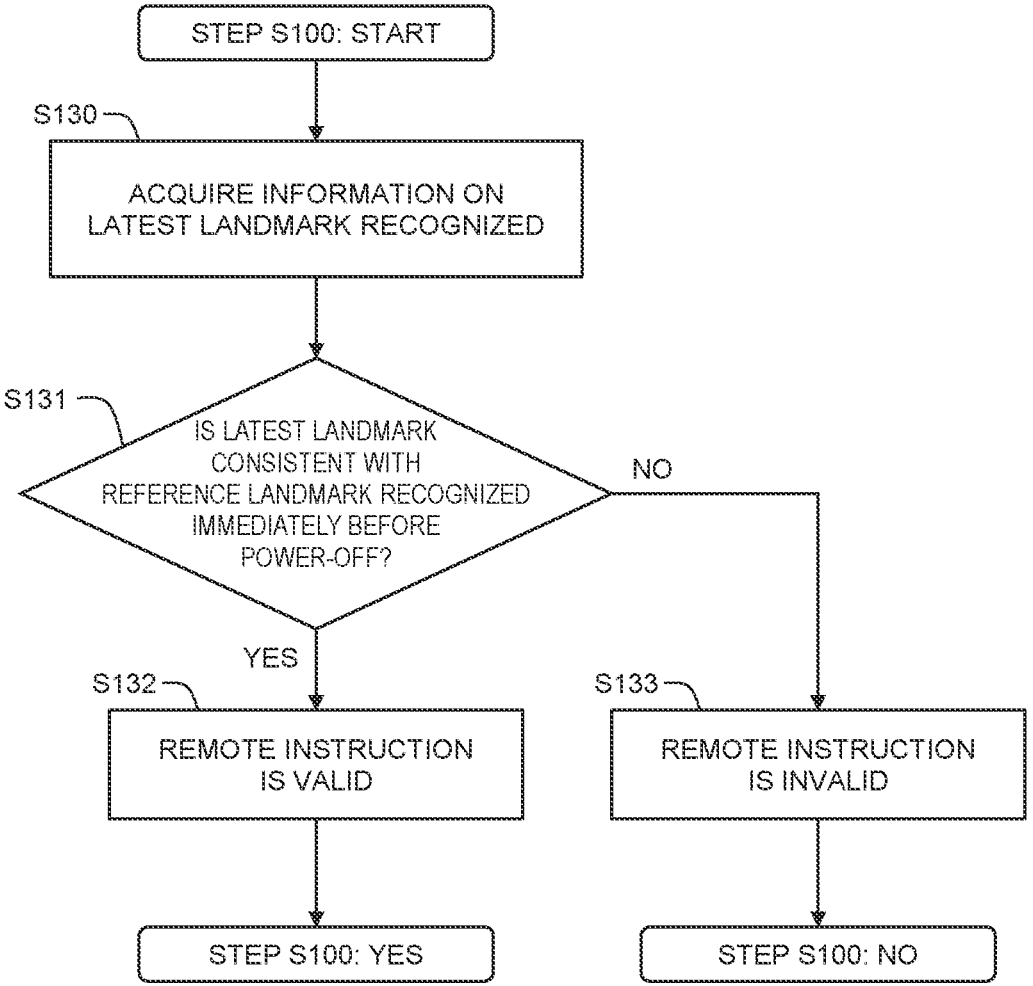
FIG. 17 is a flowchart summarizing a recognition result verification process according to an embodiment.

FIG. 17 is a flowchart summarizing the recognition result verification process performed by the recognition result verification unit 130. The recognition result verification unit 130 may be included in the in-vehicle system 10 or may be included in the management system 2. Alternatively, the recognition result verification unit 130 may be distributed to the in-vehicle system 10 and the management system 2.

In Step S130, the recognition result verification unit 130 acquires the information on the latest landmark ML recognized first from the position of the vehicle 1 after the power-on. In Step S131, the recognition result verification unit 130 determines whether or not the latest landmark ML is consistent with the reference landmark MR based on the reference information REF. When the latest landmark ML is consistent with the reference landmark MR (Step S131; Yes), the recognition result verification unit 130 determines that the received remote instruction INS is valid (Step S132). On the other hand, when the latest landmark ML is not consistent with the reference landmark MR (Step S131; No), the recognition result verification unit 130 determines that the received remote instruction INS is invalid (Step S133).

According to the recognition result verification process described above, it is possible to solve not only the problem described in FIG. 5 but also the problem described in FIG.

6. That is, it is possible to suppress the hijacking of the vehicle 1 by the fake remote instruction issuer X regardless of whether the vehicle 1 is inside or outside the predetermined area AR. Furthermore, it is also possible to detect anomaly occurrence (for example, theft) in the period when the vehicle 1 is powered off.

3-4. Combination

The remote instruction verification process may include two or more of the area verification process, the source verification process, and the recognition result verification process described above. That is, the remote instruction verification unit 100 may include two or more of the area verification unit 110, the source verification unit 120, and the recognition result verification unit 130. In the remote instruction verification unit 100, two or more of the area verification unit 110, the source verification unit 120, and the recognition result verification unit 130 may operate in parallel or in series. When at least one of the area verification unit 110, the source verification unit 120, and the recognition result verification unit 130 determines that the remote instruction INS is invalid, the remote instruction verification unit 100 determines that the remote instruction INS is invalid.

The combination of the two or more of the area verification process, the source verification process, and the recognition result verification process further improves the accuracy of the remote instruction verification process.

3-5. Effects

As described above, according to the present embodiment, when the vehicle 1 receives the remote instruction INS, the remote instruction verification process is performed to determine whether or not the remote instruction INS is valid. When the remote instruction INS received by the vehicle 1 is invalid, the operation limiting process that limits at least a part of the operation of the vehicle 1 without following the remote instruction INS is performed. This makes it possible to suppress the abuse of the function of the vehicle 1 that operates in accordance with the remote instruction INS. In other words, it is possible to suppress the hijacking of the vehicle 1 by the fake remote instruction issuer X. As a result, for example, theft of the vehicle 1 and accident occurrence are suppressed.

4. Vehicle Control System

A vehicle control system (a moving body control system) according to the present embodiment includes the remote instruction verification unit 100 described above.

For example, the remote instruction verification unit 100 is included in the in-vehicle system 10 of the vehicle 1. In this case, the in-vehicle system 10 of the vehicle 1 corresponds to the vehicle control system.

As another example, the remote instruction verification unit 100 may be included in the management system 2. In this case, the management system 2 corresponds to the vehicle control system.

As still another example, the remote instruction verification unit 100 may be distributed to the in-vehicle system 10 and the management system 2. In this case, a combination of the management system 2 and the in-vehicle system 10 corresponds to the vehicle control system.

5. Example of in-Vehicle System

5-1. Configuration Example

Figure 18:
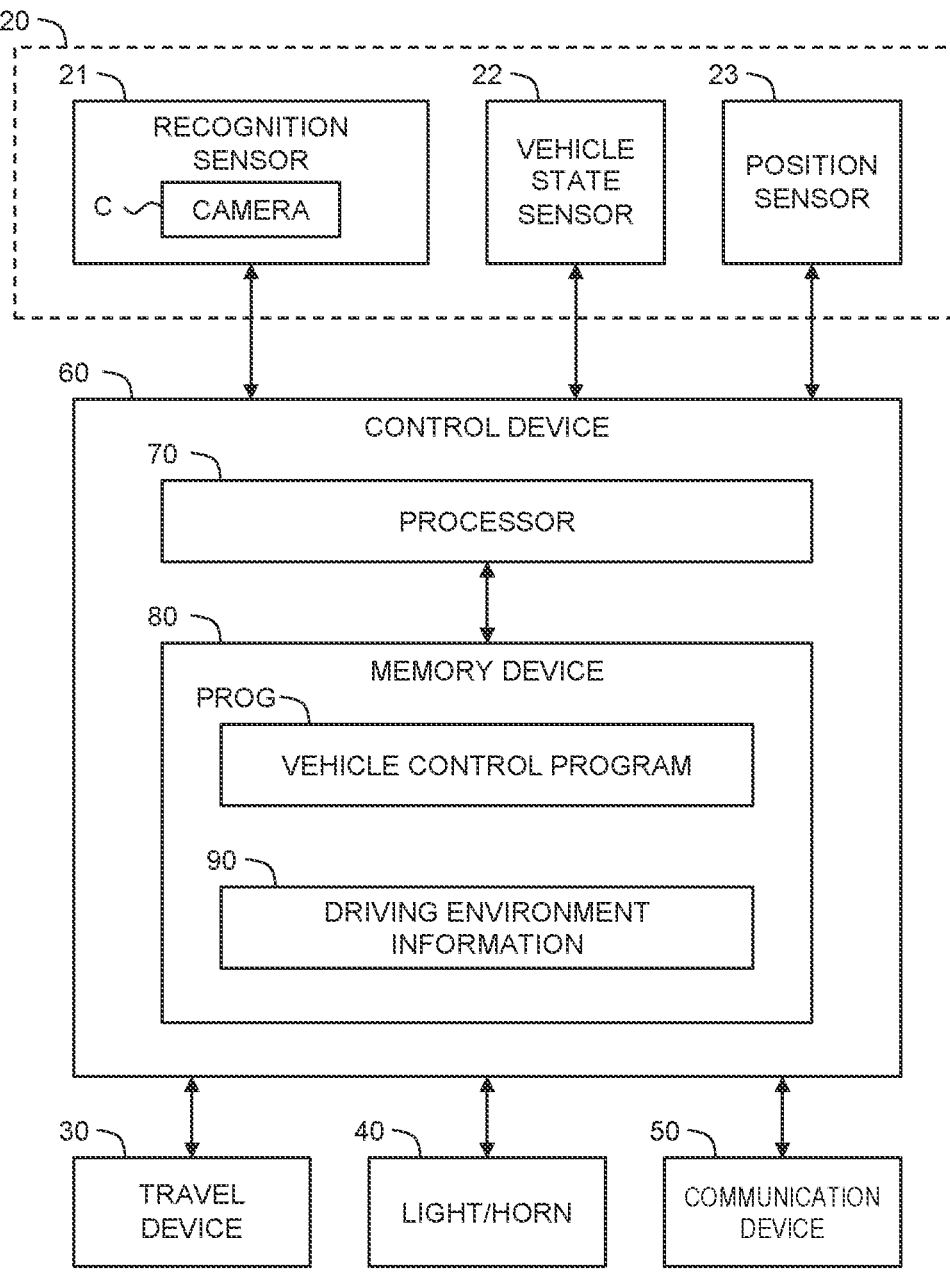
FIG. 18 is a block diagram showing a configuration example of an in-vehicle system according to an embodiment.

FIG. 18 is a block diagram showing a configuration example of the in-vehicle system 10 according to the present embodiment. The in-vehicle system 10 includes a sensor group 20, a travel device 30, light/horn 40, a communication device 50, and a control device 60.

The sensor group 20 includes a recognition sensor 21, a vehicle state sensor 22, a position sensor 23, and the like.

The recognition sensor 21 recognizes (detects) a situation around the vehicle 1. The recognition sensor 21 includes a camera C. The camera C captures image information indicating a situation around the vehicle 1. The recognition sensor 21 may include a laser imaging detection and ranging (LIDAR), a radar, and the like.

The vehicle state sensor 22 detects a state of the vehicle 1. For example, the vehicle state sensor 22 includes a speed sensor (a wheel speed sensor), an acceleration sensor, a yaw rate sensor, a steering angle sensor, and the like.

The position sensor 23 detects a position and an orientation of the vehicle 1. The position sensor 23 is exemplified by a GPS (Global Positioning System) sensor.

The travel device 30 includes a steering device, a driving device, and a braking device. The steering device steers wheels. For example, the steering device includes an electric power steering (EPS) device. The driving device is a power source that generates a driving force. Examples of the driving device include an engine, an electric motor, and an in-wheel motor. The braking device generates a braking force.

The light/horn 40 include a light and a horn. Examples of the light include a headlight and a hazard lamp.

The communication device 50 communicates with the outside of the vehicle 1. For example, the communication device 50 communicates with the management system 2. As another example, the communication device 50 communicates with the communication device 5 (see FIG. 10) installed in the predetermined area AR. The communication with the communication device 5 installed in the predetermined area AR is performed by a specific communication scheme. For example, the specific communication scheme is a short-range wireless communication scheme such as WiFi (registered trademark), Bluetooth (registered trademark), and the like.

The control device 60 (controller) is a computer that controls the vehicle 1. The control device 60 includes one or more processors 70 (hereinafter, simply referred to as a processor 70) and one or more memory devices 80 (hereinafter, simply referred to as a memory device 80). The processor 70 executes a variety of processing. For example, the processor 70 includes a central processing unit (CPU). The memory device 80 stores a variety of information. Examples of the memory device 80 include a volatile memory, a nonvolatile memory, a hard disk drive (HDD), a solid state drive (SSD), and the like. The control device 60 may include one or more electronic control units (ECUs).

A vehicle control program PROG is a computer program for controlling the vehicle 1. A variety of processing by the control device 60 may be implemented by the processor 70 executing the vehicle control program PROG. The vehicle control program PROG is stored in the memory device 80. Alternatively, the vehicle control program PROG may be recorded on a non-transitory computer-readable recording medium.

5-2. Driving Environment Information

The control device 60 acquires driving environment information 90 indicating a driving environment for the vehicle 1. The driving environment information 90 is stored in the memory device 80.

Figure 19:
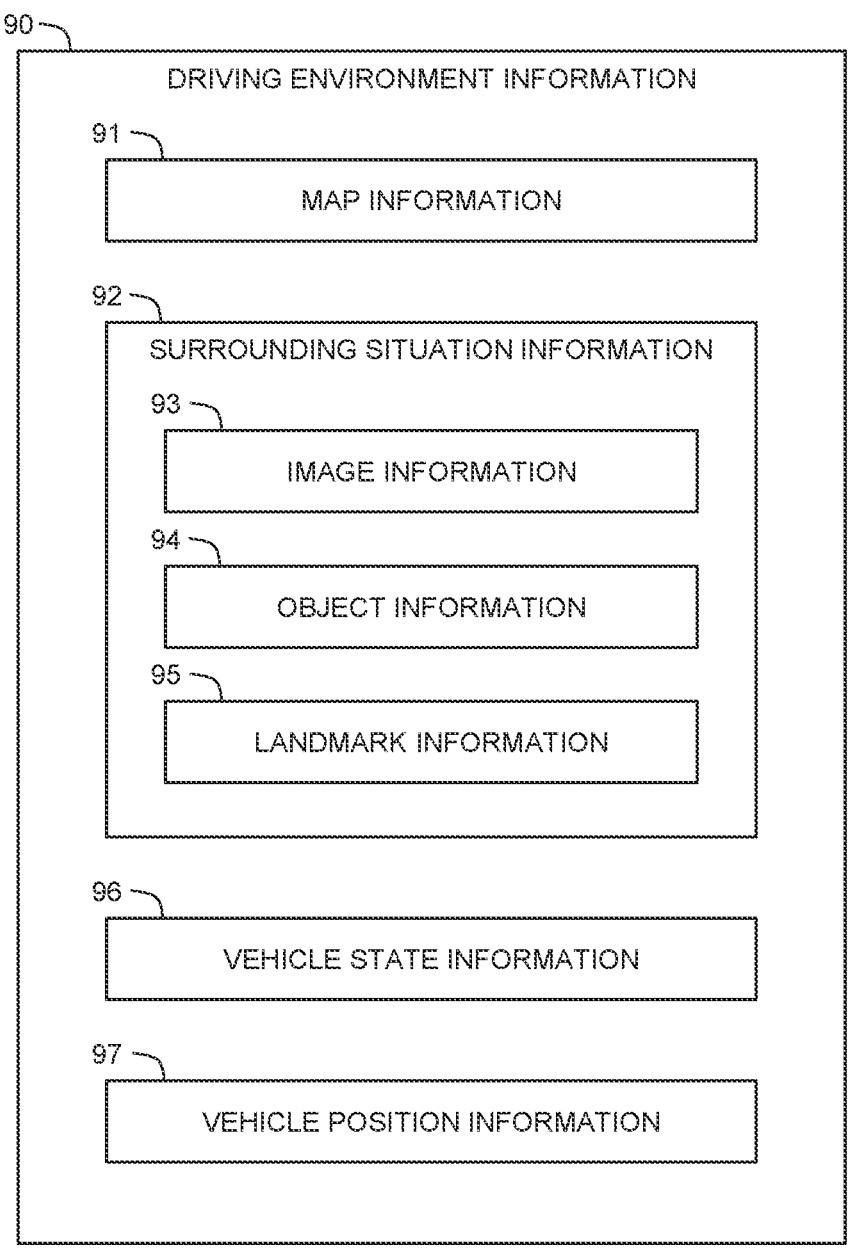
FIG. 19 is a block diagram showing an example of driving environment information according to an embodiment.

FIG. 19 is a block diagram showing an example of the driving environment information 90. The driving environment information 90 includes map information 91, surrounding situation information 92, vehicle state information 96, and vehicle position information 97.

The map information 91 includes a general navigation map. The map information 91 may indicate a lane configuration and a road shape. The map information 91 may include position information of structures, traffic signals, signs, and the like. Further, the position of the predetermined area AR (e.g., a parking lot) is registered in the map information 91. The map information 91 may include map information in the predetermined area AR. The map information 91 may include a position and identification information of each landmark (marker) M arranged in the predetermined area AR. The control device 60 acquires the map information 91 from a map database. The map database may be stored in the memory device 80 or may be stored in the management system 2. In the latter case, the control device 60 communicates with the management system 2 via the communication device 50 to acquire the necessary map information 91.

The surrounding situation information 92 is information indicating the situation around the vehicle 1. The control device 60 recognizes the situation around the vehicle 1 by using the recognition sensor 21 to acquire the surrounding situation information 92. For example, the surrounding situation information 92 includes image information 93 captured by the camera C. As another example, the surrounding situation information 92 includes point cloud information acquired by the LIDAR.

The surrounding situation information 92 further includes object information 94 regarding an object around the vehicle 1. Examples of the object include a pedestrian, a bicycle, a motor bike, another vehicle (a preceding vehicle, a parked vehicle, and the like), the landmark M, a white line, a traffic signal, a sign, a structure, an obstacle, and the like. The object information 94 indicates a relative position and a relative speed of an object with respect to the vehicle 1. For example, analyzing the image information 93 captured by the camera C makes it possible to identify an object and calculate a relative position of the object. For example, the control device 60 identifies an object in the image information 93 by using image recognition AI acquired by machine learning. It is also possible to identify an object and acquire a relative position and a relative speed of the object based on the point group information acquired by the LIDAR.

Especially, landmark information 95 is the object information 94 regarding the landmark M around the vehicle 1. The control device 60 recognizes the landmark M around the vehicle 1 by using the recognition sensor 21. For example, the control device 60 identifies the landmark M in the image information 93 by using the image recognition AI acquired by machine learning. The landmark information 95 includes a relative position of the landmark M with respect to the vehicle 1. The landmark information 95 may include identification information of the recognized landmark M.

The vehicle state information 96 is information indicating the state of the vehicle 1 and includes a vehicle speed (wheel speed), an acceleration, a yaw rate, a steering angle, and the like. The control device 60 acquires the vehicle state information 96 from the vehicle state sensor 22. The vehicle state information 96 may indicate a driving state (automated driving/manual driving) of the vehicle 1.

The vehicle position information 97 is information indicating the position and the orientation of the vehicle 1. The control device 60 acquires the vehicle position information 97 from a result of detection by the position sensor 23. In addition, the control device 60 may acquire highly accurate vehicle position information 97 by performing a well-known localization process. More specifically, the control device 60 calculates an amount of movement of the vehicle 1 based on the wheel speed and the steering angle acquired by the vehicle state sensor 22, thereby roughly calculating the vehicle position. Further, the control device 60 corrects the vehicle position by matching the position of the landmark M indicated by the map information 91 and the recognized position of the landmark M indicated by the landmark information 95. Repeating the calculation of the amount of movement and the correction of the vehicle position makes it possible to continuously acquire the highly accurate vehicle position information 97.

5-3. Vehicle Travel Control and Automated Driving Control

The control device 60 executes "vehicle travel control" that controls travel of the vehicle 1. The vehicle travel control includes steering control, acceleration control, and deceleration control. The control device 60 executes the vehicle travel control by controlling the travel device 30. More specifically, the control device 60 executes the steering control by controlling the steering device. Further, the control device 60 executes the acceleration control by controlling the driving device. Further, the control device 60 executes the deceleration control by controlling the braking device.

The control device 60 may execute automated driving control based on the driving environment information 90. More specifically, the control device 60 generates a travel plan of the vehicle 1 based on the driving environment information 90. Examples of the travel plan include keeping a current travel lane, making a lane change, making a right turn or left turn, avoiding an obstacle, and the like. Furthermore, the control device 60 generates a target trajectory required for the vehicle 1 to travel in accordance with the travel plan, based on the driving environment information 90. The target trajectory includes a target position and a target velocity. Then, the control device 60 executes the vehicle travel control such that the vehicle 1 follows the target trajectory.

5-4. Light Control, Horn Control

The control device 60 controls the light/horn 40. For example, the control device 60 turns on or blinks the light of the vehicle 1. As another example, the control device 60 blows the horn of the vehicle 1.

5-5. Communication Process

The control device 60 communicates with the outside of the vehicle 1 via the communication device 50. For example, the control device 60 communicates with the management system 2 via the communication device 50. As another example, the control device 60 communicates with the communication device 5 (see FIG. 10) in the predetermined area AR via the communication device 50.

5-6. Vehicle Control in Accordance with Remote Instruction

The control device 60 receives the remote instruction INS transmitted from the management system 2. The control device 60 basically controls the vehicle 1 in accordance with the received remote instruction INS. For example, the remote instruction INS instructs to power on or off the vehicle 1. As another example, the remote instruction INS may instruct to perform the vehicle travel control, that is, at least one of steering, acceleration, and deceleration. As still another example, the remote instruction INS may instruct to execute the automated driving control. As still another example, the remote instruction INS may instruct to recognize a situation around the vehicle 1 using the recognition sensor 21. As still another example, the remote instruction INS may instruct to lock or unlock a door of the vehicle 1.

As shown in FIG. 2 and the like, the in-vehicle system 10 includes the remote instruction reception unit 11 and the vehicle control unit 12 as functional blocks. The remote instruction reception unit 11 is realized by the communication device 50. The vehicle control unit 12 is realized by the control device 60.

5-7. Remote Instruction Verification Process

The control device 60 may perform the remote instruction verification process described in the above Section 3. That is, the control device 60 may have the function of the remote instruction verification unit 100.

5-7-1. Area Verification Process

The control device 60 may perform the area verification process described in the above Section 3-1. That is, the control device 60 may have the function of the area verification unit 110.

In the first example (see Section 3-1-1), the control device 60 determines whether or not the landmark M is recognizable from the position of the vehicle 1 based on the landmark information 95.

In the second example (see Section 3-1-2), the control device 60 determines whether or not the vehicle 1 is present in the predetermined area AR based on the map information 91 and the vehicle position information 97.

In the third example (see Section 3-1-3), the control device 60 determines whether or not the communication with the communication device 5 installed in the predetermined area AR is established via the communication device 50.

5-7-2. Source Verification Process

The control device 60 may perform the source verification process described in the above Section 3-2. That is, the control device 60 may have the function of the source verification unit 120. More specifically, the control device 60 transmits the inquiry information INQ to the management system 2 via the communication device 50. The control device 60 receives the reply information REP from the management system 2 via the communication device 50.

5-7-3. Recognition Result Verification Process

The control device 60 may perform the recognition result verification process described in the above Section 3-3. That is, the control device 60 may have the function of the recognition result verification unit 130. More specifically, the control device 60 acquires the reference information REF corresponding to the reference landmark MR based on the landmark information 95. The reference information REF is stored in, for example, the memory device 80. In addition, the control device 60 acquires the information on the latest landmark ML based on the landmark information 95. Then, the control device 60 determines whether or not the latest landmark ML is consistent with the reference landmark MR.

5-8. Operation Limiting Process

The control device 60 performs the operation limiting process described in the above Section 3. More specifically, the control device 60 generates the operation limiting signal LMT according to the result of the remote instruction verification process. Then, the control device 60 limits at least a part of the operation of the vehicle 1 based on the operation limiting signal LMT without following the remote instruction INS.

6. Example of Management System

6-1. Configuration Example

Figure 20:
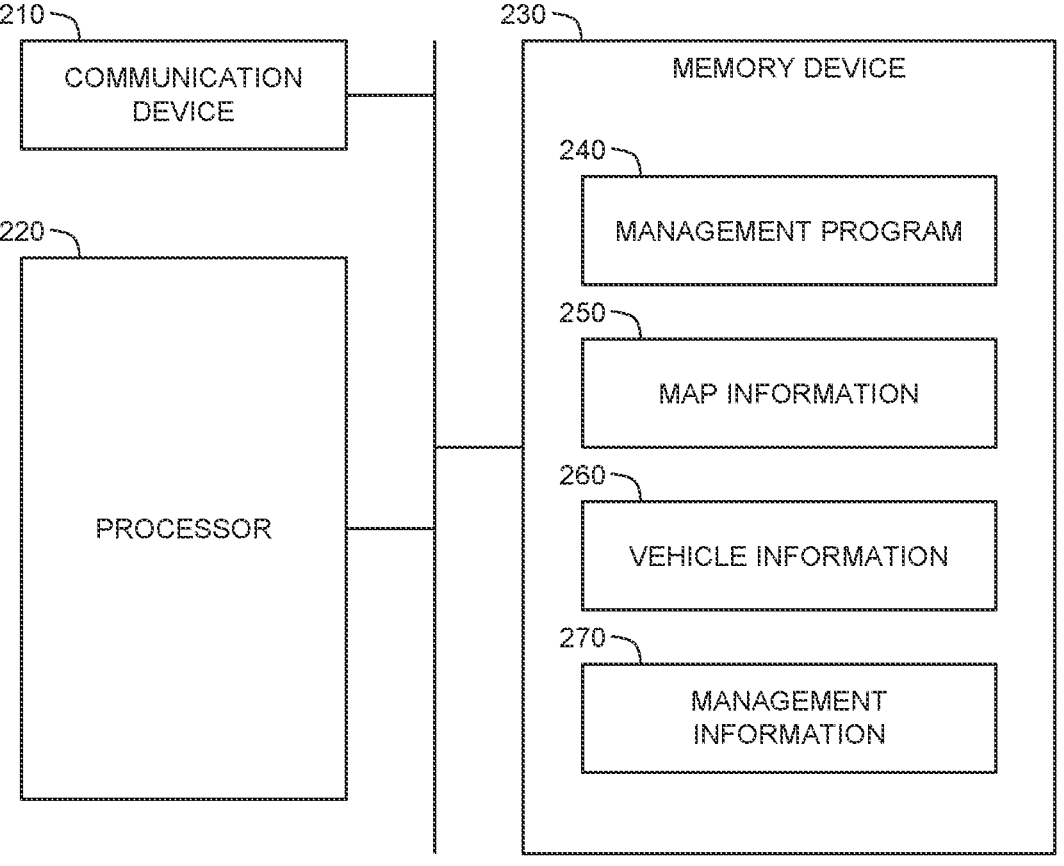
FIG. 20 is a block diagram showing a configuration example of a management system according to an embodiment.

FIG. 20 is a block diagram showing a configuration example of the management system 2 according to the present embodiment. The management system 2 includes a communication device 210, one or more processors 220 (hereinafter, simply referred to as a processor 220), and one or more memory devices 230 (hereinafter, simply referred to as a memory device 230).

The communication device 210 communicates with the outside via a communication network. For example, the communication device 210 communicates with the in-vehicle system 10 of the vehicle 1. The communication device 210 may include the communication device 5 (see FIG. 10) installed in the predetermined area AR. The communication device 5 installed in the predetermined area AR communicates with the in-vehicle system 10 of the vehicle 1 by a specific communication scheme. For example, the specific communication scheme is a short-range wireless communication scheme such as WiFi (registered trademark), Bluetooth (registered trademark), and the like.

The processor 220 executes a variety of processing. For example, the processor 220 includes a CPU. The memory device 230 stores a variety of information. Examples of the memory device 230 include a volatile memory, a nonvolatile memory, an HDD, an SSD, and the like.

A management program 240 is a computer program executed by the processor 220. Functions of the management system 2 may be implemented by the processor 220 executing the management program 240. The management program 240 is stored in the memory device 230. Alternatively, the management program 240 may be recorded on a non-transitory computer-readable recording medium. The management program 240 may be provided via a network.

6-2. Variety of Information

Map information 250 is similar to the map information 91 described above. The map information 250 includes a general navigation map. The map information 250 may indicate a lane configuration and a road shape. The map information 250 may include position information of structures, traffic signals, signs, and the like. Further, the position of the predetermined area AR (e.g., a parking lot) is registered in the map information 250. The map information 250 may include map information in the predetermined area AR. The map information 250 may include a position and identification information of each landmark (marker) M arranged in the predetermined area AR. The map information 250 is stored in advance in the memory device 230.

Vehicle information 260 is information transmitted from the in-vehicle system 10 of the vehicle 1. For example, the vehicle information 260 includes the image information 93 captured by the camera C mounted on the vehicle 1. As another example, the vehicle information 260 may include the landmark information 95 regarding the landmark M recognized by the recognition sensor 21. As still another example, the vehicle information 260 may include the vehicle position information 97 indicating the position of the vehicle 1. The processor 220 acquires the vehicle information 260 from the in-vehicle system 10 via the communication device 210 and stores the acquired vehicle information 260 in the memory device 230.

Management information 270 is information used for management by the management system 2. For example, the management information 270 includes service information regarding a service managed by the management system 2. The service information includes, for example, a usage status of the service. As another example, the management information 270 may include user information regarding users of the service.

6-3. Landmark Recognition Process

The processor 220 can recognize the landmark M around the vehicle 1 based on the image information 93 included in the vehicle information 260.

6-4. Remote Instruction Transmission Process

The processor 220 generates the remote instruction INS for the vehicle 1, as necessary. The processor 220 communicates with the in-vehicle system 10 via the communication device 210 to transmit the remote instruction INS to the in-vehicle system 10.

For example, in the case of the automated valet parking shown in FIG. 3, when the AVP vehicle 1A enters or exits the parking lot, the remote instruction INS instructing the power ON is transmitted to the in-vehicle system 10.

6-5. Remote Instruction Verification Process

The processor 220 may perform the remote instruction verification process described in the above Section 3. That is, the processor 220 may have the function of the remote instruction verification unit 100.

6-5-1. Area Verification Process

The processor 220 may perform the area verification process described in the above Section 3-1. That is, the processor 220 may have the function of the area verification unit 110.

In the first example (see Section 3-1-1), the processor 220 determines whether or not the landmark M is recognizable from the position of the vehicle information 1 based on the image information 93 or the landmark information 95 included in the vehicle information 260.

In the second example (see Section 3-1-2), the processor 220 determines whether or not the vehicle 1 is present in the predetermined area AR based on the map information 250 and the vehicle position information 97 included in the vehicle information 260.

In the third example (see Section 3-1-3), the processor 220 determines whether or not the communication with the in-vehicle system 10 of the vehicle 1 is established via the communication device 210 (the communication device 5 installed in the predetermined area AR).

6-5-2. Source Verification Process

The processor 220 may perform the source verification process described in the above Section 3-2. That is, the processor 220 may have the function of the source verification unit 120. More specifically, the processor 220 receives the inquiry information INQ from the in-vehicle system 10 via the communication device 210. The processor 220 checks whether or not it has actually transmitted the remote instruction INS to the vehicle 1. Then, the processor 220 returns the reply information REP indicating the check result to the in-vehicle system 10 via the communication device 210.

6-5-3. Recognition Result Verification Process

The processor 220 may perform the recognition result verification process described in the above Section 3-3. That is, the processor 220 may have the function of the recognition result verification unit 130. More specifically, the processor 220 acquires the reference information REF corresponding to the reference landmark MR based on the image information 93 or the landmark information 95 included in the vehicle information 260. The reference information REF is stored in, for example, the memory device 230. The processor 220 acquires information regarding the latest landmark ML on the basis of the image information 93 or the landmark information 95 included in the vehicle information 260. Then, the processor 220 determines whether or not the latest landmark ML is consistent with the reference landmark MR.

6-6. Operation Limiting Process

The processor 220 may perform the operation limiting process described in the above Section 3. More specifically, the processor 220 generates the operation limiting signal LMT according to the result of the remote instruction verification process. The processor 220 transmits the operation limiting signal LMT to the in-vehicle system 10 via the communication device 210. Transmitting the operation limiting signal LMT to the in-vehicle system 10 makes it possible to indirectly limit the operation of the vehicle 1.

6-7. Confirmation Process

Here, the automated valet parking shown in FIG. 3 is considered. While the AVP vehicle 1A is parked in the parking lot, the management system 2 (the vehicle management center 2A) may transmit a test remote instruction INS-T to the AVP vehicle 1A. The test remote instruction INS-T instructs to power on the parked AVP vehicle 1A. For example, the management system 2 regularly transmits the test remote instruction INS-T. As another example, the management system 2 may transmit the test remote instruction INS-T a predetermined time before a reserved exit time.

In response to the test remote instruction INS-T, the remote instruction verification unit 100 performs the remote instruction verification process described in Section 3. If any anomaly is detected, the remote instruction verification unit 100 notifies the management system 2 of the anomaly detection (Step S400 in FIG. 8). This makes it possible to voluntarily detect the anomaly occurrence in the AVP vehicle 1A.

When the anomaly detection is not notified even after an elapse of a certain period of time from the transmission of the test remote instruction INS-T, the management system 2 determines that the parked AVP vehicle 1A is normal. In this case, the management system 2 transmits a remote instruction INS instructing power-off to the AVP vehicle 1A.

As described above, transmitting the test remote instruction INS-T makes it possible to check the status of the parked AVP vehicle 1A.

What is claimed is:

1. A moving body control method for controlling a moving body having a function of operating in accordance with a remote instruction in a predetermined area, the moving body control method comprising:

performing, in response to a trigger signal, a remote instruction verification process that determines whether the remote instruction received by the moving body is a valid remote instruction issued with permission or a fake remote instruction issued maliciously without permission;

operating the moving body in accordance with the remote instruction in response to the remote instruction being the valid remote instruction; and performing an operation limiting process that limits at least a part of an operation of the moving body without following the remote instruction, in response to the remote instruction received by the moving body being the fake remote instruction, wherein the remote instruction verification process includes an area verification process, a source verification process, and a recognition result verification process, the area verification process includes:

determining whether the moving body is present in the predetermined area at a time in response to the moving body receiving the remote instruction; and determining that the remote instruction is the fake remote instruction, in response to the determination that the moving body is not present in the predetermined area at the time;

the source verification process includes:

transmitting inquiry information to determine that the remote instruction has been actually transmitted to the moving body;

receiving reply information indicative of a result including transmitting of the remote instruction; and determining that the remote instruction is the fake instruction in response to the reply information indicating that there is no transmission of the remote instruction, and the recognition result verification process includes:

recognizing a latest landmark from a position of the moving body after a power-on;

acquiring reference information stored in a predetermined storage device, the reference information corresponding to a reference landmark recognized from a position of the moving body before power-off;

determining that the latest landmark is not consistent with the reference landmark; and determining that the remote instruction is the fake instruction in response to determining that the latest landmark is not consistent with the reference landmark.

2. The moving body control method according to claim 1, wherein the operation limiting process includes powering off the moving body.

3. The moving body control method according to claim 1, wherein the operation limiting process includes prohibiting movement of the moving body.

4. The moving body control method according to claim 3, wherein the operation limiting process includes issuing an alarm from the moving body while prohibiting the movement of the moving body.

5. The moving body control method according to claim 1, wherein in response to the moving body in motion receiving the remote instruction, the operation limiting process includes stopping the moving body.

6. The moving body control method according to claim 1, wherein a landmark is arranged in the predetermined area, and the determining whether the moving body is present in the predetermined area includes:

determining that the landmark is recognizable from the position of the moving body; and determining that the moving body is not present in the predetermined area, in response to determining that the landmark is not recognizable from the position of the moving body.

7. The moving body control method according to claim 1, wherein:

the determining whether the moving body is present in the predetermined area includes:

acquiring position information of the moving body; and determining that the moving body is present in the predetermined area by comparing the position information of the moving body with map information in which a position of the predetermined area is registered.

8. The moving body control method according to claim 1, wherein:

the moving body and a communication device installed in the predetermined area are configured to communicate with each other in accordance with a short-range wireless communication scheme, and the determining whether the moving body is present in the predetermined area includes:

determining that a communication is established between the moving body and the communication device; and determining that the moving body is not present in the predetermined area, in response to determining that the communication is not established between the moving body and the communication device.

9. The moving body control method according to claim 1, further comprising performing autonomous traveling of the moving body in accordance with the remote instruction.

10. The moving body control method according to claim 1, further comprising:

transmitting, in response to receiving the remote instruction, the trigger signal.

11. The moving body control method according to claim 1, wherein the predetermined area includes a parking lot.

12. A moving body control system for controlling a moving body having a function of operating in accordance with a remote instruction in a predetermined area, the moving body control system comprising:

one or more processors, wherein the one or more processors are configured to:

perform, in response to a trigger signal, a remote instruction verification process that determines whether or not the remote instruction received by the moving body is a valid remote instruction issued with permission or a fake remote instruction issued maliciously without permission;

operate the moving body in accordance with the remote instruction in response to the remote instruction being the valid remote instruction; and perform an operation limiting process that limits at least a part of an operation of the moving body without following the remote instruction, when the remote instruction received by the moving body is the fake remote instruction, wherein the remote instruction verification process includes an area verification process, a source verification process, and a recognition result verification process, the area verification process includes:

determining whether or not the moving body is present in the predetermined area at a time in response to the moving body receiving the remote instruction; and determining that the remote instruction is the fake remote instruction, in response to the determination that the moving body is not present in the predetermined area at the time, the source verification process includes:

transmitting inquiry information to determine that the remote instruction has been actually transmitted to the moving body;

receiving reply information indicative of a result including transmitting of the remote instruction, and determining that the remote instruction is the fake instruction in response to the reply information indicating that there is no transmission of the remote instruction, and the recognition result verification process includes:

recognizing a latest landmark from a position of the moving body after a power-on;

acquiring reference information stored in a predetermined storage device, the reference information corresponding to a reference landmark recognized a position of the moving body before power-off;

determining that the latest landmark is not consistent with the reference landmark; and determining that the remote instruction is the fake instruction in response to determining that the latest landmark is not consistent with the reference landmark.

13. A non-transitory computer-readable recording medium on which a moving body control program for controlling a moving body having a function of operating in accordance with a remote instruction in a predetermined area is recorded, the moving body control program, when executed by a computer, causing the computer to:

perform, in response to a trigger signal, a remote instruction verification process that determines whether or not the remote instruction received by the moving body is a valid remote instruction issued with permission or a fake remote instruction issued maliciously without permission;

operate the moving body in accordance with the remote instruction in response to the remote instruction being the valid remote instruction; and perform an operation limiting process that limits at least a part of an operation of the moving body without following the remote instruction, when the remote instruction received by the moving body is the fake remote instruction, wherein the remote instruction verification process includes an area verification process, a source verification process, and a recognition result verification process, the area verification process includes:

determining whether or not the moving body is present in the predetermined area at a time in response to the moving body receiving the remote instruction; and determining that the remote instruction is the fake remote instruction, in response to the determination that the moving body is not present in the predetermined area at the time, the source verification process includes:

transmitting inquiry information to determine that the remote instruction has been actually transmitted to the moving body;

receiving reply information indicative of a result including transmitting of the remote instruction; and determining that the remote instruction is the fake instruction in response to the reply information indicating that there is no transmission of the remote instruction, and the recognition result verification process includes:

recognizing a latest landmark from a position of the moving body after a power-on;

acquiring reference information stored in a predetermined storage device, the reference information corresponding to a reference landmark recognized from a position of the moving body before power-off;

determining that the latest landmark is not consistent with the reference landmark; and determining that the remote instruction is the fake instruction in response to determining that the latest landmark is not consistent with the reference landmark.

* * * * *